United States Patent
Har-Shai et al.

(10) Patent No.: US 11,892,890 B2
(45) Date of Patent: Feb. 6, 2024

(54) POWER CONVERTER FAILURE DETECTION AND PREVENTION

(71) Applicant: Solaredge Technologies Ltd., Herzeliya (IL)

(72) Inventors: Liron Har-Shai, Tel Mond (IL); Israel Gershman, Yehud (IL); Igor Morozov, Kfar-Yona (IL); David Lachmann, Mevaseret Zion (IL); Vitaly Zlotnikov, Petah Tikva (IL); Bryon Gomberg, Kfar Saba (IL); Yoav Galin, Raanana (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/151,911

(22) Filed: Jan. 9, 2023

(65) Prior Publication Data

US 2023/0229221 A1 Jul. 20, 2023

Related U.S. Application Data

(63) Continuation of application No. 16/728,885, filed on Dec. 27, 2019, now Pat. No. 11,599,176.
(Continued)

(51) Int. Cl.
*G06F 1/30* (2006.01)
*H02H 3/24* (2006.01)
(Continued)

(52) U.S. Cl.
CPC ............. *G06F 1/30* (2013.01); *H02H 3/24* (2013.01); *H02H 7/1216* (2013.01); *H02H 11/008* (2013.01)

(58) Field of Classification Search
CPC .......... G06F 1/30; H02H 3/24; H02H 7/1216; H02H 11/008
See application file for complete search history.

(56) References Cited

U.S. PATENT DOCUMENTS 5,235,252 A * 8/1993 Blake ................ H05B 47/20
315/159
5,376,785 A * 12/1994 Chin .................. G01D 5/34
250/227.21
(Continued)

FOREIGN PATENT DOCUMENTS

KR 101865086 B1 6/2018
WO 2005078673 A1 8/2005
WO 2018136414 A1 7/2018

OTHER PUBLICATIONS

Mar. 27, 2020—EP Search Report—EP 19220060.8.
(Continued)

*Primary Examiner* — Scott Bauer
(74) *Attorney, Agent, or Firm* — Banner & Witcoff, Ltd.

(57) ABSTRACT

A power device includes one or more electrical components, the electrical components including one or more physical attribute. The power device includes one or more sensors configured to monitor the attribute(s). The power device includes a non-transitory computer-readable storage medium including one or more alerting rule. The power device includes one or more processors configured for retrieving the one or more alerting rule from the storage medium. The processors are configured for monitoring one or more sensor value from the sensor(s), wherein the sensor values are associated with the attribute(s). The processors are configured for evaluating the at least one alerting rule during the monitoring, and when the one or more alerting rule results in a pending failure condition, sending a notification to a user.

20 Claims, 12 Drawing Sheets

Related U.S. Application Data

(60) Provisional application No. 62/786,596, filed on Dec. 31, 2018.

(51) Int. Cl.
*H02H 7/12* (2006.01)
*H02H 11/00* (2006.01)

(56) References Cited

U.S. PATENT DOCUMENTS

| | | | | |
|---|---|---|---|---|
| 5,532,473 | A | * | 7/1996 | Chin .................. G01D 5/34 250/214 PR |
| 2009/0109021 | A1 | | 4/2009 | Paoletti et al. |
| 2011/0012867 | A1 | * | 1/2011 | Lee .................. G06F 3/0428 345/175 |
| 2013/0282313 | A1 | | 10/2013 | Wank et al. |
| 2014/0064328 | A1 | | 3/2014 | Roth |
| 2015/0309095 | A1 | | 10/2015 | Monnerie et al. |
| 2020/0326453 | A1 | * | 10/2020 | Marshall .................. G01V 8/14 |

OTHER PUBLICATIONS

I. Novak et al., "Determining PCB Trade Impedance by TDR: Challenges and Possible Solutions," DesignCon 2013, Jan. 28-31, 2013.
"Power Electronics Use Plastic Film Capacitors, MKCP4 Series," Hitachi AIC Inc.
"Specification for Approval—DKMJ-P 18uF +/−5% 450VDC THB Design," BM Capacitor, Feb. 2017.
"Film Capacitors," CompoTec.
"Specification for Approval—Film Capacitor for DC-Link application THB," BM Capacitor, May 2018.
A. Ritter, "Capacitor Reliability Issues and Needs," Sandia National Laboratories Utility-Scale Grid-Tied PV Inverter Reliability Technical Workshop, AVX Corporation, Jan. 2011.
"Technical Information SD-12 Characteristics and use of infrared detectors," Hamamatsu Photonics K.K., Solid State Division, Nov. 2004.
"Specification for Approval—DKMJ-P 65uF +/−10% 700VDC THB Design," BM Capacitors, Feb. 2017.
"Infrared Thermometry Understanding and using the Infrared Thermometer," Calex Electronics Limited; http://www.calex.co.uk.
"Capacitors / Function Filtering Technical Data," AVX Corporation, FB-6-5264-A, Mar. 2015.
"Metallized Polypropylene Capacitors," Supplier Specification Submission, SolarEdge Technologies Ltd., Mar. 2017.
E. Sahle-Demessie et al., "Characterizing of Emissions from Open Burning of Electronic Waste using TG-GC-MS System," Perkin Elmer, 2017.
"Device Specification for Photodiode," Opto-Analog Devices Division Electronic Components Group Sharp Corporation, Feb. 2006.
K. Ferreira, "Fault Location for Power Transmission Systems Using Magnetic Field Sensing Coils," Worcester Polytechnic Institute, Apr. 2007.
R. Gallay, "Metallized Film Capacitor Lifetime Evaluation and Failure Mode Analysis," CAS—CERN Accelerator School: Power Converters, Geneva, Switzerland, May 2014.
"Metallized Polypropylene Capacitors," Supplier Specification Submission, SolarEdge Technologies Ltd., Dec. 2015.
E. Bogatin, "TDR and VNA Techniques for PCB Characterization," GigaTest Labs, Sunnyvale, CA.
"Film Capacitors Characteristics," Rubycon, https://www.rubycon.co.jp/en/.
"Film Capacitors Examples of Failure," Rubycon, https://www.rubycon.co.jp/en/.
"Capacitors / Function Filtering Technical Data," AVX Corporation, Product FE-6-5262-B, May 2017.
"Capacitors / Function Filtering Technical Data," AVX Corporation, Product FB-6-5264-B, Jan. 2017.
"Failure Analysis on Metallized Film Capacitor," Gideon Analytical Labs, Nov. 2012, accessed from https://gideonlabs.com/posts/failure-analysis-on-metallized-film-capacitor/.

* cited by examiner

POWER CONVERTER FAILURE DETECTION AND PREVENTION

CROSS-REFERENCE TO RELATED APPLICATIONS

The present application is a continuation of U.S. application Ser. No. 16/728,885, filed Dec. 27, 2019, which claims priority to U.S. Provisional Patent Application No. 62/786,596, filed Dec. 31, 2018, which are hereby incorporated by reference in their entireties.

BACKGROUND

Power devices, such as direct current to direct current (DC-DC) power converters, direct current to alternating current (DC-AC) power inverters (one phase, three phase, or the like), and/or the like, comprise multiple electronic components. For example, a 4 kilo-watt (KW) power inverter may comprise up to 5000 electronic components, such as capacitors, inductors, resistors, relays, transformers, processors, and/or the like. During and after manufacturing of these power electronics, the power devices may go through multiple stages of testing to ensure that the power device is fully functional before assembly and shipping to customers. These tests ensure that each device is operational according to the requirements, specifications, design, and/or the like, and that there are no faulty components.

SUMMARY

The following summary presents a simplified summary of certain features. The summary is not an extensive overview, and is not intended to identify key or critical elements.

According to the present disclosure, methods and devices for measurement of electrical impedance or temperature changes in electronic components are disclosed. Such methods and devices may use one or more sensors (also referred to herein as detectors) such as thermistors, photodiodes, antennas, radio-frequency receivers, microphones, pressure sensors, gas sensors, optical sensors, cameras, magnetic field sensors, gas chromatography sensors, transmission line transceivers, and/or the like. The sensors may be located adjacent to or remotely from electronic components, and use secondary transfer or conversion devices, such as electrical conductors, waveguides (acoustic, optical, electrical, electronic, electromagnetic, and/or the like), fiber optics, mirrors, reflectors, heat sensitive markers, temperature sensitive markers, impedance sensitive markers, thermocouples, and/or the like to transfer the physical parameter values (such as attributes or physical attributes of the components) from the components to the sensors. The impedance or temperature values may be converted to a secondary physical measurement value of improved detectability for recording by a sensor. Systems, assemblies, devices, components, and methods may be provided that illustrate aspects of selection of the dedicated sensors as well as determining the algorithm for converting the measured values to actionable impedance or temperature changes.

As noted above, this Summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

Figure 1A:
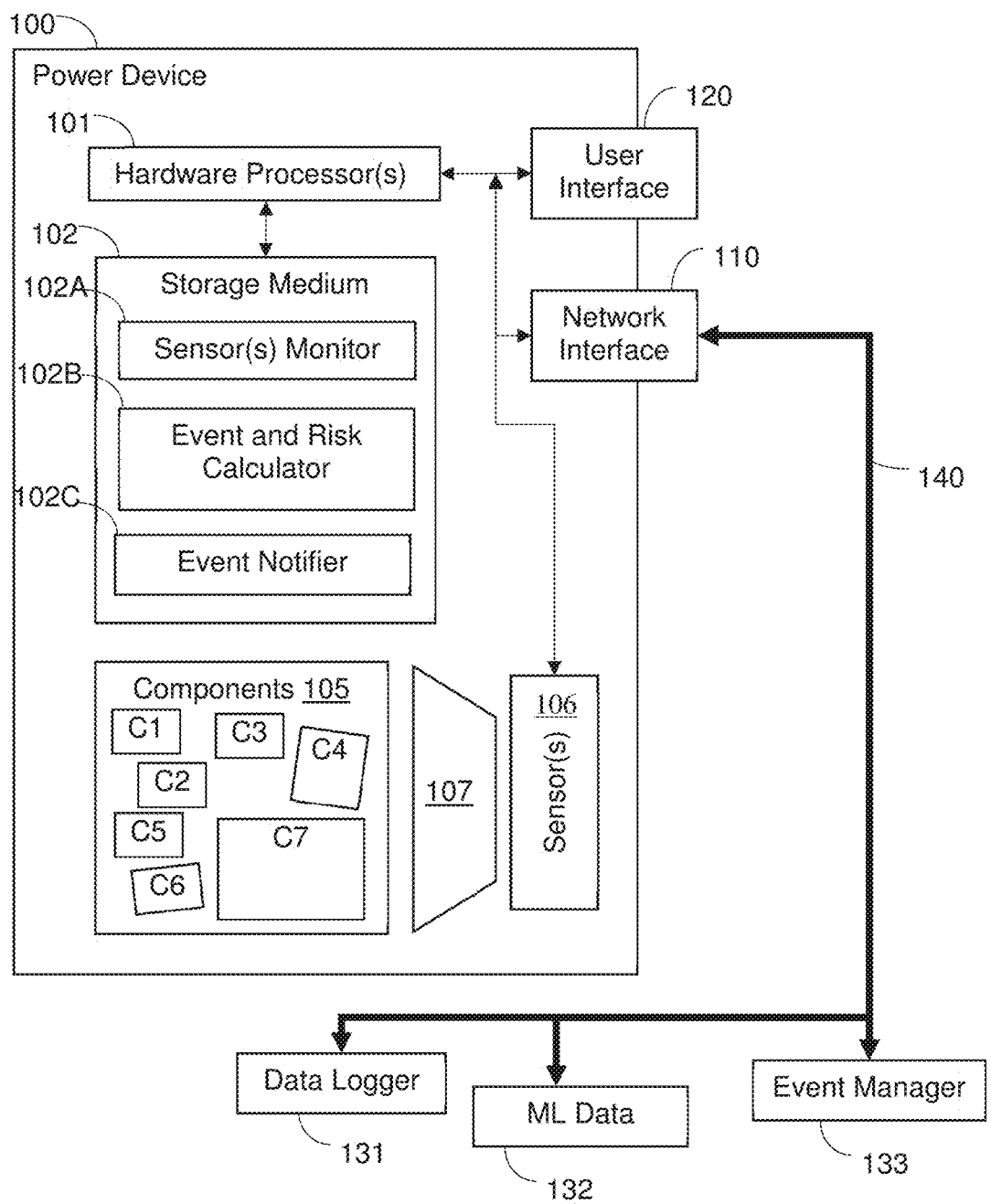
FIG. 1A shows schematically a power device with one or more sensors for monitoring multiple components, according to illustrative aspects of the disclosure.

The accompanying drawings, which form a part hereof, show examples of the disclosure. It is to be understood that the examples shown in the drawings and/or discussed herein are non-exclusive and that there are other examples of how the disclosure may be practiced.

Failure of a power device may involve the failure of one or more components of the device. The components may fail following a physical change which may lead to an impedance change. The altered impedance (such as increased impedance, decreased impedance, and/or the like) or physical change may result in altered attributes, such as heat production, electromagnetic radiation, magnetic field generation, sound, vibration, gas emission, and/or the like. For example, degradation of a component may release a gas, such as methane, hydrogen, halogen, and/or the like. Degradation of a component may release a gas, liquid, or solid depending on the component and mechanism of failure. These degradations may occur at a high temperature, such as between 80 and 600 degrees Celsius (deg C.), for example 125 deg C., 150 deg C., 180 deg C., 250 deg C., or the like. Increased heat production may result in increased temperatures, which in turn may cause further failures, gas emissions, fire, explosions, and/or the like.

Components within the power device may change over time and use (such as "aging" of the components), as well as change based on the operational environment of the power device. Aging may involve a gradual or abrupt change in impedance of the component, that results in a temperature change or other physical attribute or indication, such as noise, EMI, and/or the like. As used herein the terms attribute, physical attribute, property, physical property, parameter, physical parameter (of a component) mean a measureable physical change and these terms may be used interchangeably. Some components of the power device may be monitored during long-term operation, such as using NTC thermistors, sensors, detection circuits, and/or the like. As used herein, the term sensor means sensors, detectors, or other electronic components that may convert a physical phenomenon, such as the properties of matter and/or energy, to an electrical signal indicating the presence/absence of the phenomenon (such as in detection of the phenomenon) or a measurement of a value representing the phenomenon (such as a sensing of the phenomenon). For example, sensors may be positioned near the components that are likely to fail, that may benefit from monitoring, and/or the like. For example, a sensor may be adjacent (such as in physical contact) to the component, 1 millimeter (mm) from the component, between 1 and 10 mm, 1 centimeter from the component (cm), between 1 and 10 cm from the component, between 10 and 100 cm from the component, and/or the like. Alternatively, a sensor is located at least 1 cm, at least 2 cm, or at least 5 cm, from a component. For example, when there is no access to the location of the highest temperature of a component, such as between two adjacent components, a sensor may be placed directly on the component. The monitoring of many components may lead to layout complexity, BOM costs, and/or the like.

Specific historic failures may give indications of which components are more likely to fail, such as by a statistical analysis of failure records. Correlating the failure records to the device testing results may allow correlation of outlier analysis from the testing results to the failures, and thereby allow tighter testing controls to prevent failures. Furthermore, historic failures may be detectable with dedicated sensors that monitor the components responsible for the failures. When these sensors indicate a change to the component physical attributes or properties prior to a failure, an alert may be issued for a service check, the power device may be derated to produce less stress on these components (such as be reducing the current, current changes, voltage, voltage changes, power, and/or the like applied to the component), and/or the like.

Unknown (unpredictable) failures may occur when a component fails without any history of that component having failed previously. Such failures may occur when a component or PCB supplier is changed, a new batch of components is manufactured and used for the power device assembly, when a component manufacturer is changed, when a PCB design (such as a layout) is changed, and/or the like. These unknown failures may not be monitored by dedicated sensors that are designed to monitor these components, and may be detected by general device sensors. The general device sensors may be located, selected, and/or designed to monitor all components of the device together. The sensors may be of mixed types, so that different physical attributes of the unknown failure may be detected.

For example, a gas emission sensor, an acoustic, a vibration sensor, a visual sensor, an infrared sensor, and/or an EMI sensor may be used together to monitor a power device for unknown failures, and when any of the sensor values undergo an abrupt change, then a warning may be issued. When two or more of the sensor values undergo an abrupt change, an alarm may be issued. Different combination of sensors may be selected to detect as many unknown failures as possible based on the electronics, physics, and components used in the power device. For example, the TDK™ InvenSense® MPU-9250 may be used to detect motion, vibration, and magnetic field changes. Each power device may be more or less susceptible to unknown failures depending on the specification, design, components, testing, environment, age, operational history, and/or the like.

One or more of the sensors listed above may be found during operation, simulation, testing, and/or the like to not provide additional information over the other sensors, and be removed from future product generations. For example, a gas sensor may be incorporated into a first generation product, be found to not add additional information over the other products, and removed from the second generation product.

A failing component may affect the physical environment in a variety of ways, sometimes dependent on the failure analysis mode. For example, a film capacitor that fails due to a ripple current exceeding a threshold once every 24 hours may have specific time responses of heat, gas emissions, sounds, vibrations, color changes, and/or the like. A film capacitor failing from an over-voltage or dV/dt repeatedly reaching a limiting value may have a different failure response. For example, the film capacitor may explode catastrophically or a short circuit may occur within the film capacitor and prevent catastrophic failure. By performing failure analysis, simulating the failure responses of the physical attributes/parameters (such as by using a physical parameter simulation tool) and/or inducing failure of the power device (such as by changing the operation of the component) as a result of the failed components may provide insight into a physical parameter that is a first sign of a coming failure.

While this first sign may be temperature due to the heat generation of the altered impedance component (pre-failure), this first sign may be other measureable senses, such as sound, chemistry, smell, feel, and/or the like. Once a component or group of components may be identified as being failure prone, and the failure mechanisms and timelines determined, the optimal set of sensors/detectors may be selected to detect these failures.

According to the present disclosure, methods and devices for indirect measurement of electrical impedance or temperature changes are provided, such as the use of photodiodes, antennas, radio-frequency receivers, microphones, pressure sensors, shock sensors, gas sensors, vibration sensors, optical sensors, cameras, magnetic field sensors, gas chromatography sensors, transmission line transceivers, and/or the like. The sensors may be located remotely to the components, and use secondary direction devices, such as electrical conductors, waveguides (acoustic, optical, electrical, electronic, electromagnetic, and/or the like), fiber optics, mirrors, reflectors, heat sensitive markers, temperature sensitive markers, impedance sensitive markers, thermocouples, and/or the like to transfer the physical parameter values to the sensors/detectors.

Sensors may be grouped into the corresponding senses, or physical phenomenon, to measure representative values thereof. For example, sight, or optical sensing, may correspond to visual sensors, infrared sensors, photodetectors, photodiodes, and/or the like. For example, smell/taste, or chemical sensing, may correspond to gas sensors and the like. For example, touch, or tactile sensing, may correspond to vibration sensors and the like. For example, sound, or auditory sensing, may correspond to acoustic sensors and the like. The selection of the types of sensors and the rules/formulas that are used to detect a suspected eminent failure of the components of a power device, in general, may be based on the (1) electronic circuit design of the power device, (2) the electronic components used to produce the power device, and (3) the electronic and physical layout of the electrical and thermal components of the power device.

For example, selection of sensors for detecting component pre-failure in a particular power device may be using optical, chemical, tactile, and auditory sensors. For example, selection of sensors for detecting component pre-failure in a different particular power device may be using optical, chemical, and tactile sensors. For example, selection of sensors for detecting component pre-failure in a different particular power device may be using optical, chemical, and auditory sensors. For example, selection of sensors for detecting component pre-failure in a different particular power device may be using optical, tactile, and auditory sensors. For example, selection of sensors for detecting component pre-failure in a different particular power device may be using chemical, tactile, and auditory sensors.

For example, selection of sensors for detecting component pre-failure in a different particular power device may be using optical and chemical sensors. For example, selection of sensors for detecting component pre-failure in a different particular power device may be using optical and auditory sensors. For example, selection of sensors for detecting component pre-failure in a different particular power device may be using tactile and auditory sensors. For example, selection of sensors for detecting component pre-failure in a different particular power device may be using optical sensors. For example, selection of sensors for detecting component pre-failure in a different particular power device may be using chemical sensors. For example, selection of sensors for detecting component pre-failure in a different particular power device may be using auditory sensors. For example, selection of sensors for detecting component pre-failure in a different particular power device may be using tactile sensors.

For example, selection of sensors for detecting component pre-failure in a different particular power device may be using optical, chemical, and tactile sensors. For example, selection of sensors for detecting component pre-failure in a different particular power device may be using optical, chemical, and auditory sensors. For example, selection of sensors for detecting component pre-failure in a different particular power device may be using optical, tactile, and auditory sensors. For example, selection of sensors for detecting component pre-failure in a different particular power device may be using chemical, tactile, and auditory sensors. In particular, the benefits of each combination of sensors and the rules/formulas that are used to detect a suspected eminent failure of the components of a power device may be based on the (1) electronic circuit design of the power device, (2) the electronic components used to produce the power device, and (3) the electronic and physical layout of the electrical and thermal components of the power device.

The impedance or temperature values may be converted to a secondary physical measurement value for detection by a detector or sensor. For example, a heat sensitive marker may be used to convert the temperature to a color change of the marker, and a camera may be used to take a digital image of the marker and use a dedicated image processing method to convert to a temperature value. For example, an impedance of a component may be detected according to a change in voltage or current during a test phase of the component, such as when a component is charged (according to the impedance and an applied voltage), allowed to discharge internally while not operational, and measured after a time has evolved and the charge reduced due to internal impedance (such as due to equivalent serial resistance). Systems, assemblies, devices, components, and methods may be provided that illustrate aspects of selection of the dedicated sensors and detectors as well as determining the algorithm for converting the measured values to actionable impedance or temperature changes. For example, the actionable impedance or temperature changes may be used to send an alert to a service provider, derate (such as reduce or limit) the instantaneous power rating of the power device, perform an emergency shutdown, activate an audible alarm, and/or the like.

Electronic components that may fail include, but are not limited to, capacitors, cable connection terminals, inductors, transformers, ferrites, relays, charge bleed-off resistors, fuse holders, wiring insulation, and/or the like.

Reference is now made to FIG. 1A, which shows schematically a power device 100 with one or more sensors for monitoring multiple components. While power device 100 may use a single reference number (100), it may be understood that the power device may be a one-off prototype for proof of concept, one of many substantially similar power devices a first revision trial production run, one of many substantially similar production runs, one of many substantially similar production revisions, and/or the like. Thus the different examples may illustrate aspects of these power devices using the single reference 100 to mean one or more of the disclosed types.

Power device 100 may comprise one or more hardware processors 101, a non-transient storage medium 102, a network interface 110, a user interface 120, and components configured by a design to convert power from one form to another. The design may be defined by a schematic of the electrical connection of components 105 (such as C1, C2, C3, C4, C5, C6, and C7), the components' 105 bill of materials, the source datasheets for components 105, and/or the like. The components may be monitored by a selection of sensors and/or the like 106. When the line of sight between sensor(s) 106 and components 105 is obscured or otherwise blocked, a reflecting and/or refracting surface 107 may be used, such as a mirror, waveguide, fiber optic cable, lenses, and/or the like. Network interface 110 may be connected through a data network 140 to other components of a system, such as-remote data loggers 131, machine learning data and analysis components 132, event manager components 133, and/or the like. These may be cloud components that are virtual timesharing of physical resources, remote private resources, remote public resources, and/or the like. The local repository, such as storage medium 102, may comprise software modules such as a Sensor(s) Monitor 102A, an Event and Risk Calculator 102B, an Event Notifier 102C, and/or the like.

Figure 1B:
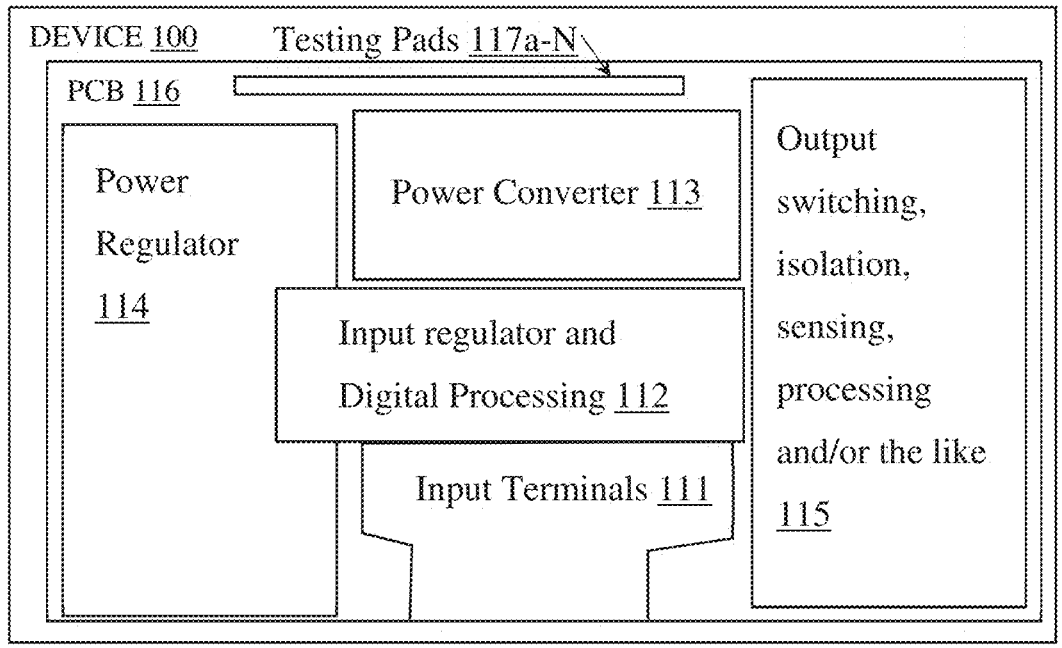
FIG. 1B shows schematically a power device and PCB regions for monitoring multiple components, according to illustrative aspects of the disclosure.

Reference is now made to FIG. 1B, which shows schematically a power device 100 and PCB 116 regions for monitoring multiple components. A PCB 116 layout may be composed of different functional regions, each functional region including electrical components needed for different functions of the power device design. For example, regions may include an input terminal region 111, an input regulator and digital processing region 112, a power converter region 113, a power regulator region 114, an output region 115, where output region 115 may comprise components for output switching, output isolation, output sensing, processing, and/or the like. PCB may have accessible testing pads such as at 117a-N which represents N testing pads on the PCB layout according to the design.

Figure 1C:
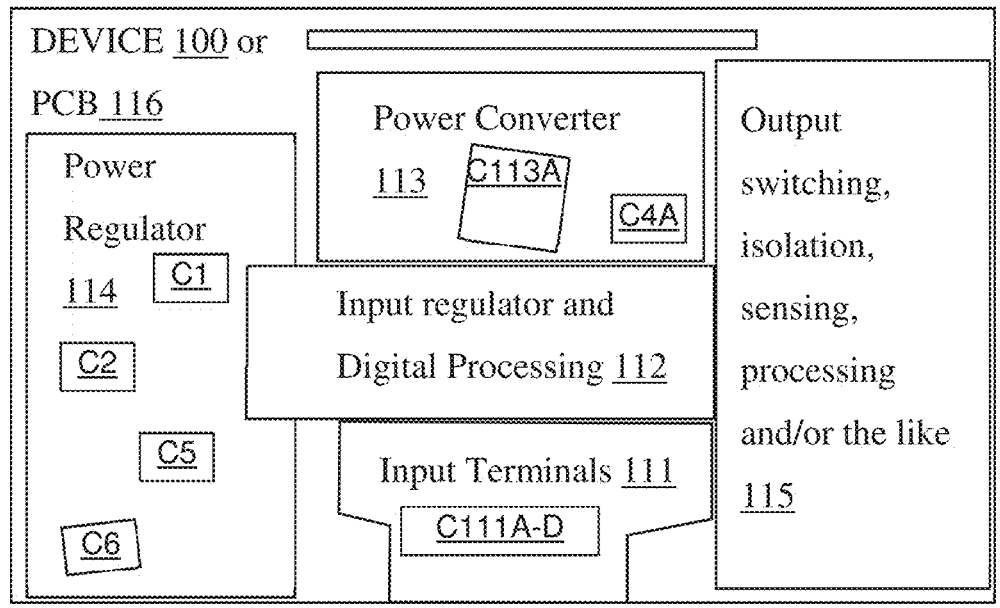
FIG. 1C shows schematically a power device or PCB for monitoring multiple components, according to illustrative aspects of the disclosure.

Reference is now made to FIG. 1C, which shows schematically a power device 100 or PCB 116 for monitoring multiple components. In the example, the input terminal region 111 contains components C111A, C111B, C111C, and C111D, which may be terminal connectors for example. In the example, the power regulator region 114 contains components C1, C2, C5, and C6, which may be capacitors for example. In the example, the power converter region 113 contains components C113A and C4A, which may be switches for example.

Figure 1D:
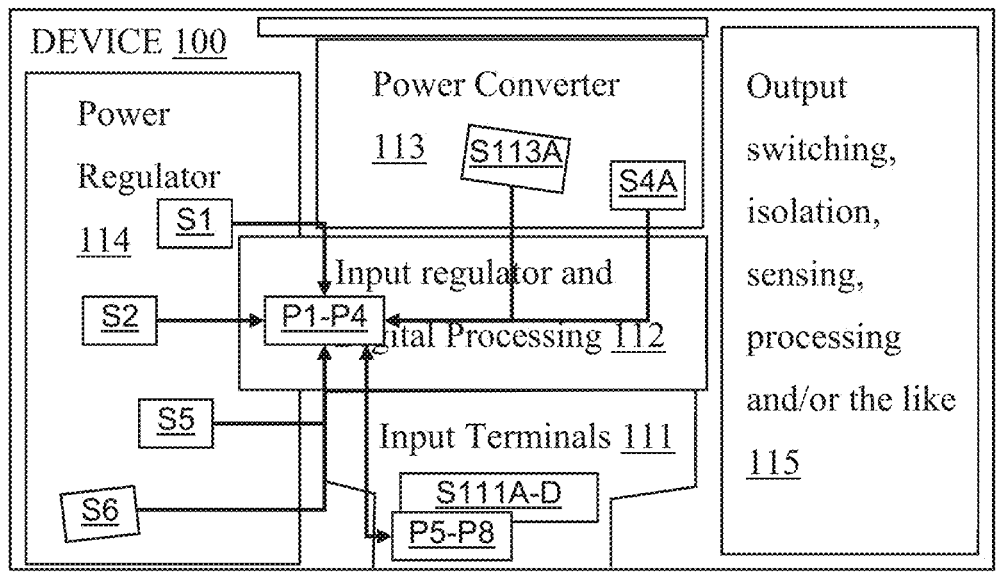
FIG. 1D shows schematically processors and sensors for monitoring multiple components, according to illustrative aspects of the disclosure.

Reference is now made to FIG. 1D, which shows schematically processors and sensors for monitoring multiple components. Device 100 may comprise a network of sensors and/or detectors for monitoring a physical characteristic of one or more components of FIG. 1C. For example, S1, S2, S5, and S6 monitor C1, C2, C3, and C4 respectively. Processor(s) P1, P2, P3, and P4 may be central processors, such as a 4-core processor, for performing the monitoring and alerting functions, and connected to the sensors, or a separate hardware processor(s) such as at P5, P6, P7, and P8, may be used to perform local monitoring of the components, such as at the input terminals, and provide fast response and dedicated algorithms for monitoring locally the components, and report the monitoring activities to the main hardware processor(s) as at P1-P4. In the example, the power converter region 113 contains sensors S113A and S4A to monitor C113A and C4A respectively. In the example, the input terminal region 111 contains sensors S111A-D to monitor C111A-D, respectively.

Figure 1E:
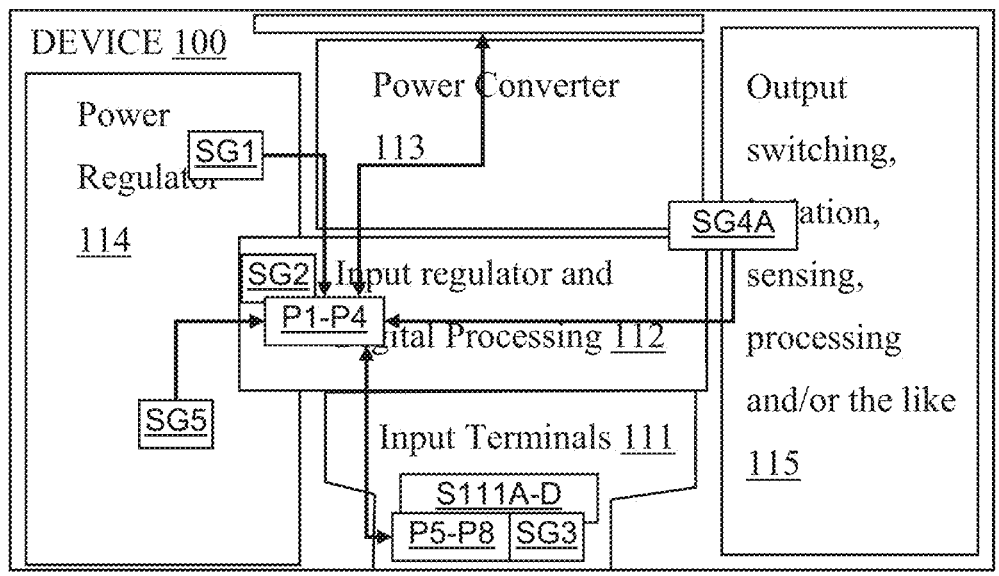
FIG. 1E shows schematically processors and sensors for a device or PCB globally, according to illustrative aspects of the disclosure.

Reference is now made to FIG. 1E, which shows schematically processors and sensors for a device or PCB globally. Hardware processor(s) P1-P4 or a different processor may be used to monitor sensor values for global sensors, such as at SG1, SG2, SG4A, and SG5, or a different processor such as at P5-P8 used to monitor global sensors such as at SG3. Hardware processor(s) P1-P4 or a different processor may be used to monitor values collected from the test pads 117a-N. The test pads may have access to intermediate electrical parameters, data parameters from the hardware processor(s) P1-P4, and or the like. In the example, the input terminal region 111 contains sensors S111A-D.

Temperature sensors/detectors, such as thermistors, thermocouples, infrared photodiodes, and/or the like, may be used to directly or indirectly to monitor temperature of components. For example, a thermal IR radiation sensor may be incorporated into the power device, such that it is located on the PCB, and oriented towards the cover of the power device. The thermal IR radiation sensor may be a single camera unit, an array of photodiodes with lenses, a single photodiode, and/or the like. The cover may have mirrors and/or waveguides to direct the IR radiation towards the sensor. When the sensor collects sensor values that represent temperatures, and a processing unit determines that the temperatures exceed a threshold, an alert may be issued, the instantaneous power of the power device may be reduced (derated), the power device may be shut down, and/or the like. A temperature sensor may be a photodiode that is only sensitive to the wavelengths corresponding to a prohibited temperature, and when a detected value is above a threshold for an amount of time, technicians may be notified and/or the situation mitigated automatically.

Figure 2:
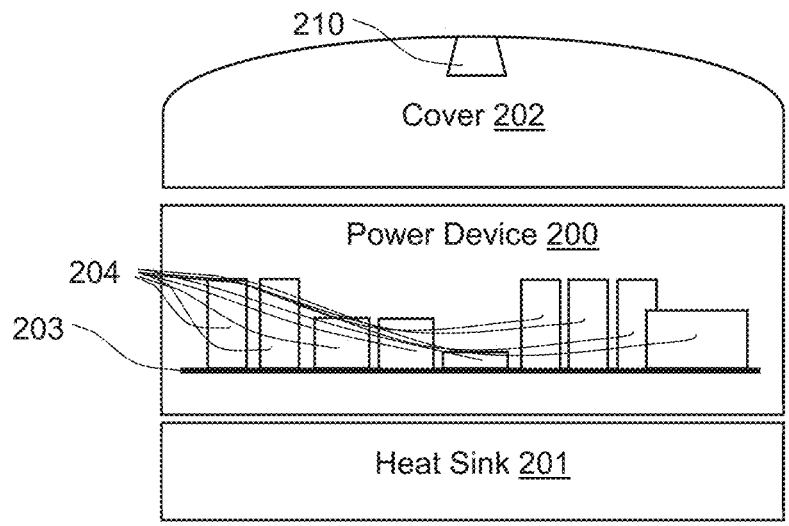
FIG. 2 shows schematically a power device with an imaging sensor on a cover for monitoring multiple components, according to illustrative aspects of the disclosure.

Reference is now made to FIG. 2, which shows schematically a power device 200 with a sensor 210, such as a temperature sensor, photodiode, thermal camera, digital imaging camera, optical sensor, and/or the like, on a cover 202 for monitoring multiple components 204. Components 204 may be located on PCB 203 attached to heat spreader or heat sink 201, and by positioning a sensor 210 at a distance from the components, such as on cover 202, the largest coverage may be achieved.

For example, Planck's Law may be used to compute the spectral radiation of an ideal black body at a certain temperature. The spectral radiation changes both peak and minimum wavelength, both of which decrease with increasing temperature. For example, the peak of a black body at 25 degrees Celsius (deg C.) is about 10 micrometers (μm), and the minimum about 2 μm, while for a black body at 700 deg C. the peak is at about 4 μm and the minimum about 0.6 μm. The peak may be computed by Wien's Displacement Law: $\lambda max=(2890)/T$, where $\lambda max$=wavelength of peak energy in microns T=temperature in degrees Kelvin. For example, the wavelength for peak energy emitted from an object at 120 degrees Celsius (120+273=393 degrees Kelvin) is: $\lambda max=2890/393K=7.35$ μm (at emissivity=1.0). For the temperature range of 120-190 deg C., the peak irradiance is approximately between 6.5 and 7 □m. The relative intensity at different temperatures and wavelengths may be found by normalizing the intensities to the peak intensity at each temperature. The following table provides normalized intensities at various temperatures and wavelengths (emissivity=1.0).

TABLE 1

| µm | fractional intensity at different temperatures (deg C.) | | | | | | | |
| --- | --- | --- | --- | --- | --- | --- | --- | --- |
| | 120 | 130 | 140 | 150 | 160 | 170 | 180 | 190 |
| 0.7 | 3.6E−16 | 1.2E−15 | 3.5E−15 | 1.0E−14 | 2.8E−14 | 7.2E−14 | 1.8E−13 | 4.3E−13 |
| 0.8 | 1.3E−13 | 3.5E−13 | 9.0E−13 | 2.2E−12 | 5.3E−12 | 1.2E−11 | 2.7E−11 | 5.6E−11 |
| 0.9 | 1.1E−11 | 2.7E−11 | 6.3E−11 | 1.4E−10 | 3.0E−10 | 6.1E−10 | 1.2E−09 | 2.3E−09 |
| 1 | 3.9E−10 | 8.6E−10 | 1.8E−09 | 3.6E−09 | 7.1E−09 | 1.3E−08 | 2.5E−08 | 4.4E−08 |
| 1.1 | 6.8E−09 | 1.4E−08 | 2.6E−08 | 5.0E−08 | 9.0E−08 | 1.6E−07 | 2.7E−07 | 4.6E−07 |
| 1.2 | 7.0E−08 | 1.3E−07 | 2.4E−07 | 4.2E−07 | 7.2E−07 | 1.2E−06 | 2.0E−06 | 3.1E−06 |
| 1.3 | 4.9E−07 | 8.7E−07 | 1.5E−06 | 2.5E−06 | 4.1E−06 | 6.5E−06 | 1.0E−05 | 1.5E−05 |
| 1.4 | 2.5E−06 | 4.3E−06 | 7.0E−06 | 1.1E−05 | 1.7E−05 | 2.7E−05 | 4.0E−05 | 5.8E−05 |
| 1.5 | 1.0E−05 | 1.7E−05 | 2.6E−05 | 4.0E−05 | 6.0E−05 | 8.9E−05 | 1.3E−04 | 1.8E−04 |
| 1.6 | 3.4E−05 | 5.3E−05 | 8.1E−05 | 1.2E−04 | 1.7E−04 | 2.5E−04 | 3.5E−04 | 4.8E−04 |
| 1.8 | 2.4E−04 | 3.5E−04 | 5.0E−04 | 7.1E−04 | 9.7E−04 | 1.3E−03 | 1.8E−03 | 2.3E−03 |
| 2 | 1.1E−03 | 1.5E−03 | 2.1E−03 | 2.8E−03 | 3.6E−03 | 4.7E−03 | 6.0E−03 | 7.6E−03 |
| 3 | 6.4E−02 | 7.6E−02 | 9.0E−02 | 1.1E−01 | 1.2E−01 | 1.4E−01 | 1.6E−01 | 1.8E−01 |
| 4 | 3.2E−01 | 3.6E−01 | 3.9E−01 | 4.3E−01 | 4.6E−01 | 5.0E−01 | 5.3E−01 | 5.6E−01 |
| 5 | 6.6E−01 | 6.9E−01 | 7.3E−01 | 7.6E−01 | 8.0E−01 | 8.2E−01 | 8.5E−01 | 8.8E−01 |
| 6 | 9.0E−01 | 9.2E−01 | 9.4E−01 | 9.6E−01 | 9.7E−01 | 9.8E−01 | 9.9E−01 | 1.0E+00 |
| 7 | 9.9E−01 | 1.0E+00 | 1.0E+00 | 1.0E+00 | 1.0E+00 | 9.9E−01 | 9.8E−01 | 9.7E−01 |
| 8 | 9.8E−01 | 9.7E−01 | 9.6E−01 | 9.5E−01 | 9.3E−01 | 9.1E−01 | 8.9E−01 | 8.8E−01 |
| 9 | 9.1E−01 | 8.9E−01 | 8.7E−01 | 8.5E−01 | 8.3E−01 | 8.0E−01 | 7.8E−01 | 7.6E−01 |
| 10 | 8.2E−01 | 7.9E−01 | 7.7E−01 | 7.4E−01 | 7.1E−01 | 6.9E−01 | 6.6E−01 | 6.4E−01 |

The normalized intensities show, for example, that single photon sensors may be used for wavelengths up to about 2.5 µm, and above 2.5 µm, photodetectors may detect the intensities associated with different temperatures. For example, a First Sensor model AD500-9-TO52-S1 avalanche photodiode may be used with an appropriately configured detection circuit to detect a small number of photons associated with high component temperatures, such as above 150 deg C.

Photodetectors may be used below 2.5 µm when sufficient time is allowed for collecting data. Statistical methods may be used to determine when the sensor values represent a temperature signal or noise. For example, an IR photodetector at 1 µm may be used to collect sensor values until there is a statistically significant computation that the sensor values represent the irradiance intensities associated with components above 150 deg C., and the power device may be derated to a lower power that does not cause overheating of the components. An alert may be sent to a user to indicate that a component may have reached a high temperature, and subsequently, a technician may be dispatched to the location of the power device for diagnosis and/or maintenance of the power device.

At higher wavelengths, such as above 3 µm, a photodetector may determine that a normal operating temperature produces irradiance at the detected wavelength at a first intensity, and then monitor the intensity during operation over time, such as each day at midday, to determine that the intensity does not exceed the first intensity. When the intensity exceeds the first intensity by a certain amount, such as 5-25%, the power device may take action to prevent failure, including derating, alerting, and/or the like. A test period may be used to determine the first intensity, such as by a technician measuring the solar irradiance and estimating a first intensity threshold.

Infrared thermal sensors may be broadband, narrow band, ratio and/or the like. For example, a broadband thermal sensor may be used at a wavelength close to peak wavelength and a high strength signal is used to detect an over-temperature occurrence. For example, a narrowband thermal sensor may be used to detect a minimum wavelength exceeding a threshold. For example, a ratio thermal sensor may be used to detect the ratio of two narrowband wavelengths to determine that the allowed temperature has been exceeded. For example, a narrow thermal sensor may be a Sharp Microelectronics PD410PI2E00F photodetector that has a peak spectral sensitivity at 1 µm corresponding to a possible detection of 150-170 deg C. within up to 3 seconds (depending on sensor sampling rate). For example, the detection is near the noise threshold and the noise is sampled until a temperature is detected. For example, a narrow thermal sensor may be an Osram SFH-3600 phototransistor that may detect 150-170 deg C. within up to 0.5 seconds (depending on sensor sampling rate) by passing a current that signals the power device to perform a derating when the spectral density at 1 mm wavelength reaches a threshold. Selection of the photodiode and design of the interruption circuit is key to an effective failure monitoring and detection.

Emissivity may also be adjusted to allow better temperature detection. For example, when a selected number of components are to be monitored, the emissivity of these components may be set close to 1.0, and the emissivity of the components that do not need to be monitored may be set close to 0.0 to reduce the sensor signal from the non-monitored components.

Other aspects may be incorporated to improve the sensor signal from overheating components, such as increasing the percentage field of view of the components of interest (such as by limiting the detection of components that are not monitored), modifying sensor materials to be differentially sensitive to the critical threshold temperatures (such as a sensor that may amplify detection of components at temperatures of 150 deg C.), adjusting sensor sensitivities, and/or the like.

Thermal mapping may be performed using a limited number of thermal sensors at several locations, and converting the pattern of measurements of the components at these locations to temperature measurements at the other locations where a sensor is not located. For example, area sensors (such as thermal or optical imaging sensors and/or the like) may determine patterns of sensor values and when the patterns are disrupted, an indication of impeding failure may be presented and an alert initiated, and/or the like. For example, a limited number of sensors may be selected so that sufficient differentiation of a pattern may be detected.

Thermal imaging may be performed using a thermal camera, similar to a low-cost digital image camera of a smartphone but configured to detect the infrared radiation associated with increased temperatures. A combination of sensors may be used that when combined, such as by computing a value for each pixel, produce an estimated value for the temperature of the components seen in the frame. The components that are not line of sight with the sensor may be monitored using a mirror, waveguide, lens, fiber optic cable, or the like.

Infrared photodiodes may be used to detect particular frequencies of infrared radiation, such as IR radiation associated with 150 deg C. For example, an InAs/GaAs Quantum Dot Mid-Infrared Photodetector on a silicon substrate may be used to detect 7 micrometer wavelength IR radiation.

In some cases, temperature may be converted to a secondary physical measurement, such as when using a thermosensitive marker that changes color according to temperature. The color may be detected with an inexpensive surface mount camera module. For example, Rohm Semiconductor product BH1745NUC-E2 may be used to detect colors of a temperature marker or toxic gas marker.

Thermal detection may be performed using one or more photodiodes arranged in a location that allows monitoring the temperature of the components, such as arranged in an array on the inside of the cover opposing the components. By long term monitoring of the photodiode circuits and converting to temperature estimates, thermal patterns may be identified that are associated with overheating of the critical components. For example, the temperature increase may be seen a few hours in advance of a catastrophic failure. By identifying a possible future failure before it occurs, appropriate changes to the inverter operation (such as derating) may be initiated and an alert issued to service the inverter. The inverter may be shut down when catastrophic failure is eminent, and a warning or notification issued to a service provide to perform maintenance to determine the cause of overheating.

Thermal detection may be performed using a distributed temperature sensing (DTS) technique, such as an optical time domain reflectometry technique, a Raman technique, an optical frequency domain reflectometry technique, code correlation DTS, and or the like. In DTS, an optic cable is placed near the components to be monitored and used as a linear sensor. The increased temperature from the components causes the characteristics of light transmission in the optical cable to change, such as the lattice oscillations within the solid. Interaction between photons and the oscillating lattice may result in changes to the light, such as Rayleigh scattering and/or the like. The scattering may result in a frequency shift of the light and other changes. These changes may be analyzed to determine both the location of the temperature change as well as the absolute temperature with high accuracy.

By positioning a fiber optic cable throughout the PCB, the temperature of components near the fiber optic cable may be monitored. A diode laser may be used to send a photon signal, such as a coded signal, along the optic cable, and the frequency and spatial scattering measured. The analysis of the scattering allows computing of the highest temperature along the optic cable, and when the highest temperature exceeds a threshold, steps may be performed to prevent a catastrophic failure of the power device.

Visual detection of a possible future failure may be performed by a visual analysis, such as by a color change, a visual change of a heat sensitive marker, and/or the like. For example, a component that is exhibiting excessive heat prior to failure may show a browning or color change based on the long term exposure to excessive heat prior to failure. An imaging sensor, optical sensor, camera, visual sensor, and/or the like may be used to acquire images of the components, and image analysis performed to detect changes to the components as a result of the temperature.

Figure 3:
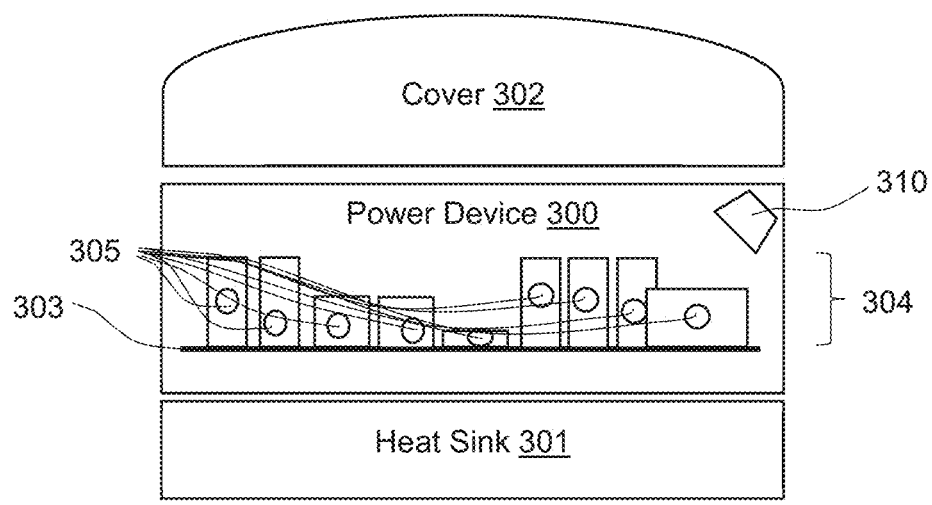
FIG. 3 shows schematically a power device with an imaging sensor and markers for monitoring multiple components, according to illustrative aspects of the disclosure.

Reference is now made to FIG. 3, which shows schematically a power device 300 with an imaging sensor 310 and markers 305 for monitoring multiple components 304. Components 304 may be located on PCB 303 attached to heat spreader or heat sink 301. Power device 300 may include a cover 302. A camera or imaging sensor 310 may be located at a distance above the components, such as in a corner of device 300. A sacrificial component may be used that is easy to monitor but is sensitive to one or more physical parameter, such as when a lower heat rated component is used. A lower heat rated component may fail when the temperature reaches 105 deg C. and the failure may be easily detectable, such as with a low cost sensor, without a sensor, and/or the like.

For example, Rohm Semiconductor product BH1745NUC-E2 may be used to detect colors heat sensitive markers, component heat discoloration, visible heat of components, and/or the like.

The shape of the components may be monitored using visual analysis of the components to detect expansion, leakage, and/or the like.

Figure 4:
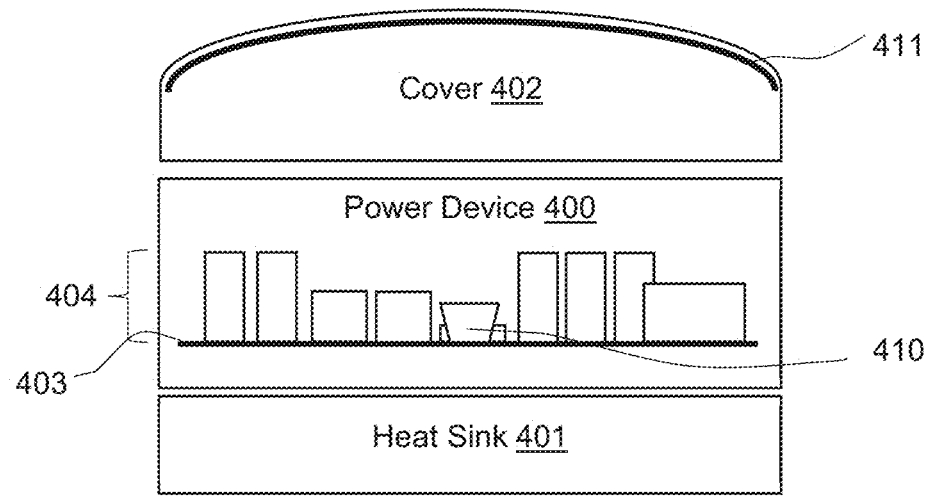
FIG. 4 shows schematically a power device with an imaging sensor with a mirror on a cover for monitoring multiple components, according to illustrative aspects of the disclosure.

Reference is now made to FIG. 4, which shows schematically a power device 400 with an imaging sensor 410 with a mirror 411 on a cover 402 for monitoring multiple components 404. Components 404 may be located on PCB 403 attached to heat spreader or heat sink 401. A camera or imaging sensor 410 may be positioned on the PCB, and mirror 411 may reflect the color, visual, or infrared radiation from components 404 to the camera 410.

Gas emissions may be detected using a dedicated detection to a particular kind of gas, such as a methane sensor, a hexane sensor, a toluene sensor, a xylene sensor, an ion sensor, a CO sensor, a $CO_2$ sensor, and/or the like. For example, prior to a catastrophic failure a component may overheat internally, thereby releasing methane vapor associated with the breakdown of the component's internal isolating material. For example, the overheating of the component material produces carbon monoxide (CO) as a byproduct, and the CO is easily detectable over the ambient amounts of this gas.

Figure 5:
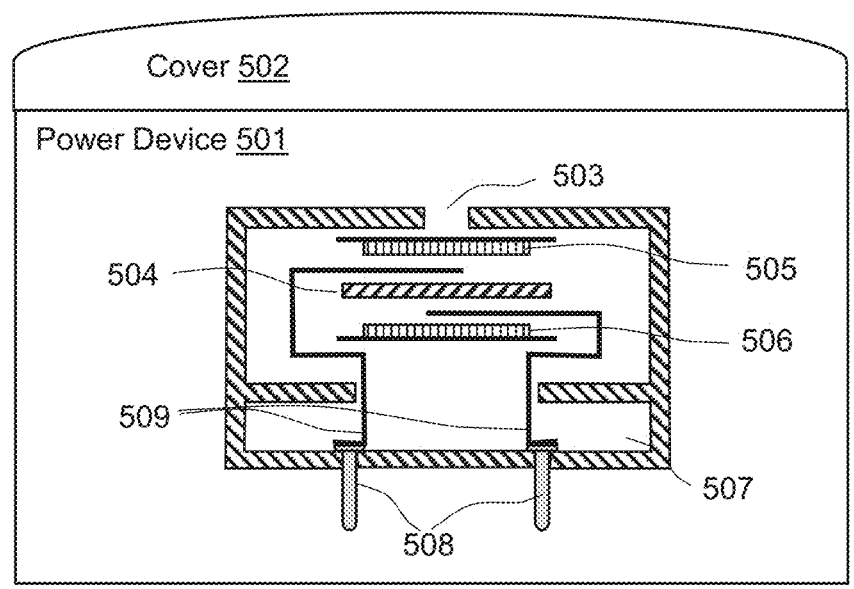
FIG. 5 shows schematically a power device with a gas sensor for monitoring multiple components, according to illustrative aspects of the disclosure.

Reference is now made to FIG. 5, which shows schematically a power device 501 with a gas sensor for monitoring multiple components. Power device 501 may include a cover 502. Gas sensor within device 501 may comprise a diffusion barrier 503, a separator 504, a sensing electrode 505, a counter electrode 506, an electrolyte 507, sensor pins 508, current collectors 509, and/or the like.

For example, a humidity sensor may be used to detect water vapor.

Sound detection of a failure initiation may be associated specific sounds or frequencies, such as vibrations, harmonics, and/or the like, and these may be detected by a microphone, acoustic sensor, pressure sensor, motion sensor, and/or the like. For example, Gaussian mixture models (GMM) may be used to isolate the components of certain sounds associated with the failure or certain components. The power device sounds may be monitored and analyzed by GMM, and the GMM supervectors analyzed to determine when a component failure may be eminent.

Figure 6:
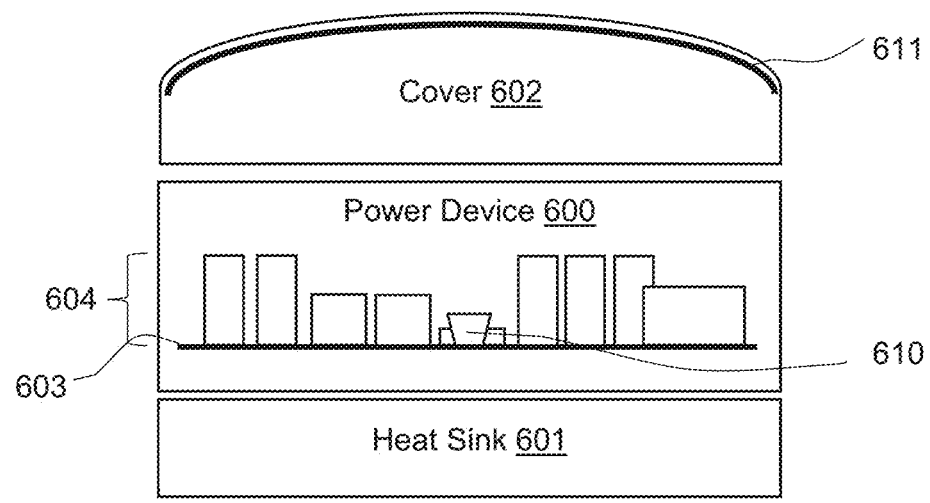
FIG. 6 shows schematically a power device with an acoustic sensor with a cover acting as a sound box for monitoring multiple components, according to illustrative aspects of the disclosure.

Reference is now made to FIG. 6, which shows schematically a power device 600 with an acoustic sensor 610 with a cover 602 acting as a sound box for monitoring multiple components 604. Components 604 may be located on PCB 603 attached to heat spreader or heat sink 601. An acoustic sensor 610, such as a microphone, may be positioned on PCB 603 to allow easy integration into device 600. Cover 602 may have an acoustic insert 611 that channels, for example, the sounds from components 604 to a microphone 610.

Acoustic mapping may be performed with multiple microphones, acoustic sensors, directional microphones, and/or the like. The data from multiple sensors with known locations may be converted into maps of sounds at specific intermediate locations based on the proportional signal intensities of the same sounds from different sensors. Thus a spatial map of the sounds source locations may be computed to better detect possible failures based on the sounds and known locations of the components. For example, when an acoustic mapping determines that a film capacitor is making sounds associated with a ferrite cracking, then it may be assumed that the acoustic mapping may be erroneous. In similar ways, the possible failure associated with certain sounds may be confirmed or denied based on the acoustic mapping of the source of the sound being in line with then known component locations.

Since the prevention of electromagnetic interference (EMI) is of great concern in most electronic products, and or particular concern in power devices, the monitoring of EMI may give indication of eminent failures in components, such as magnetic, inductive, capacitive, or resistive components. When the impedance of one component changes, the balance of the components that minimized EMI may be disrupted and the EMI of the device may increase dramatically. This increased EMI may be easily detected using an RF receiver and antenna tuned to the switching frequency of the power device, or one of the switching frequency harmonics.

Figure 7:
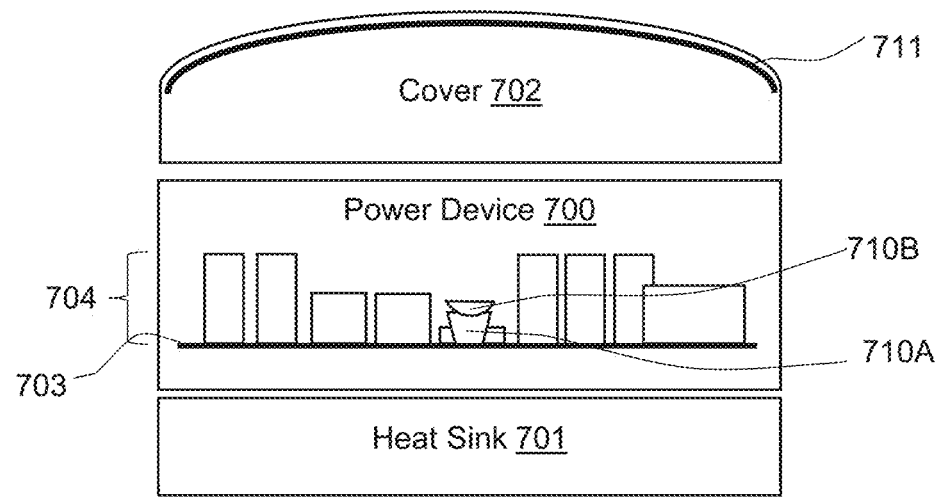
FIG. 7 shows schematically a power device with an antenna and receiver for monitoring multiple components, according to illustrative aspects of the disclosure.

Reference is now made to FIG. 7, which shows schematically a power device 700 with an antenna 710B and receiver 710A for monitoring multiple components 704. Components 704 may be located on PCB 703 attached to heat spreader or heat sink 701. The antenna 710B and receiver 710A may be positioned on PCB 703 to allow easy integration into device 700. Cover 702 may have a reflecting insert 711, such as a radio antenna dish, that channels for example the EMI from components 704 to sensors 710A and 710B.

A gyroscopic sensor may be used to detect the vibrations of the power device or one of the associated components, such as the PCB, the cover, the heat sink, the terminal detaching devices, and/or the like. Similar to certain sounds, the presence of vibrations at certain frequencies may indicate that one or more components is failing or is about to fail. For example, an arcing condition at one of the terminals of the power device may be associated with both sound and vibration.

Figure 8:
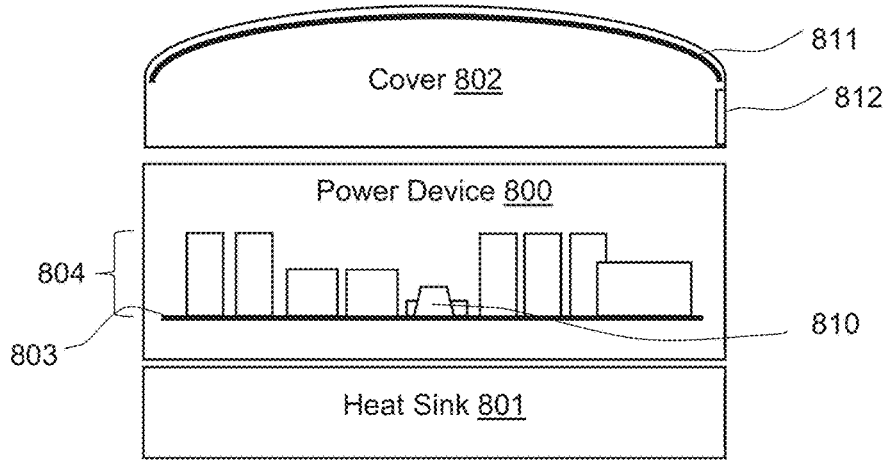
FIG. 8 shows schematically a power device with a vibration sensor for monitoring multiple components, and a pressure relief knockout on a cover, according to illustrative aspects of the disclosure.

Reference is now made to FIG. 8, which shows schematically a power device 800 with a vibration sensor 810 for monitoring multiple components 804, and one or more pressure relief sections 812 on a cover 802, such as on the side, top, bottom, back, and/or the like, of the cover. Components 804 may be located on PCB 803 attached to heat spreader or heat sink 801. Vibration sensor 810 may be positioned on PCB 803 to allow easy integration into device 800. Cover 802 may have a pressure or vibration reflecting insert 811, and a pressure relief section 812 of cover 802. When a catastrophic event occurs, the pressure relief may be configured to allow the pressure generated inside the device 800 housing to expand out of the enclosure by pressing against pressure relief section 812 until the section detaches from cover 802 and the pressure is released.

For example, Murata Electronics product number PKGS-25SXAP1-R may be used to detect vibrations, and the vibrations may indicate the physical response of the components to an impedance change, a temperature change, and/or the like. The data recorded by the vibration sensor may be analyzed by a computer, such as a local processor of the power device, a home computer, a server, a cloud resource, and/or the like. For example, a GMM applied to the vibration data may be used to compute a supervector of acoustic parameters, such as a supervector of 5000 parameters, and the acoustic parameters may be used to identify sounds of components exhibiting acoustic behavior identifiable with catastrophic failure, similarly to using supervectors for voice recognition.

Force sensors or strain sensors may be used to detect vibrations, such as when a strain gauge is connected to a diaphragm, an elongated material, and/or the like.

Time Domain Reflectometry and Refractometry (TDRR) of the circuit leads across/around the components may be used to detect changes in component impedance, similarly to the changes in PCB impedance seen with TDR. The injection and/or detection points for each TDR may be surrounding specific components undergoing testing, or distributed around the board for TDRR imaging of the circuit. An injection point may be the circuit location for electrical connection of a transmitter lead, and a detection point may be a cuit location for electrical connection of a receiver lead.

Figure 9:
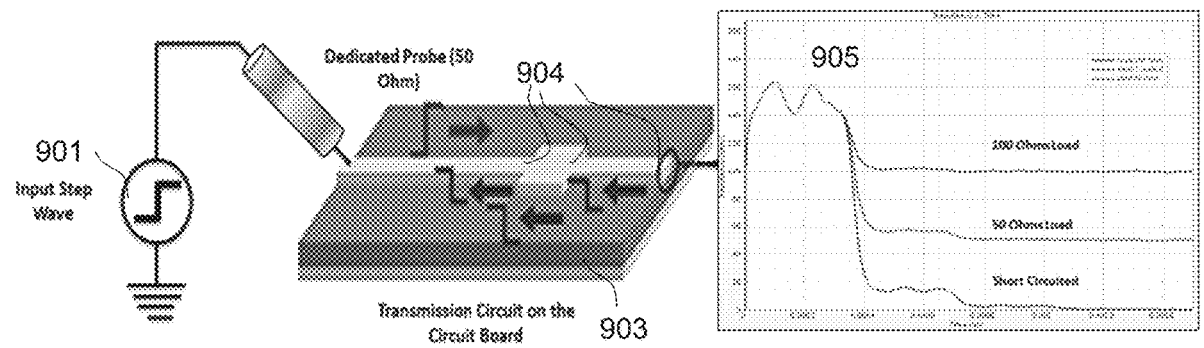
FIG. 9 shows schematically a power device with a transmission line transceiver for monitoring multiple components, according to illustrative aspects of the disclosure.

Reference is now made to FIG. 9, which shows schematically a power device with a transmission line transceiver 901 for monitoring multiple components, such as a transmission line reflection sensor. The circuit board 903 acts as a transmission line, and all the impedance changes 904 along the electrical path may cause a measureable change in the reflection 905 of the signal energy.

The frequency of the testing during TDRR may be selected from a range of frequencies, or changed dynamically to detect multiple aspects of a components impedance (wavelength dependent changes). For example, a sweep frequency technique may be used to isolate resonances and/or wave combinations (such as wave additions or wave cancellations) of the transmission wavelengths. For example, during a specific board's testing, a transmission line signature may be detected and recorded, and during field operation of the board the transmission line signature is monitored daily for any impedance changes in the circuit.

To use a single transceiver with multiple injection/detection points, a switching network may be used, such as an FPGA, a dedicated IC, a series of relays, and/or the like. For example, an electronic multiplexer such as the Fairchild 74F138 may be used to switch the transceiver between 8 different testing locations of the circuit.

Magnetic field detection may be used to detect changes to the magnetic components of a power device, for example, ferrites of inductors, transformers, and of the like. For example, an AK8963 magnetometer from Asahi Kasei Microdevices Corporation may be used to detect when the ferrite of a large inductor has been fractured during operation. When a ferrite or magnetic component becomes mechanically compromised, a change in the magnetic field may be detected, such as by the absence of a magnetic field, the appearance of a magnetic field, no change to a magnetic field when one is expected, and/or the like.

When a mapping technique is used, the number of sensors or sensor elements may be determined based on the design and detectable limit of the component failure. For example, the number of elements/sensors may determine the spatial resolution, temporal resolution, signal to noise ratio, accuracy, detection limit, and/or the like. In some example designs, the temporal resolution and detection limit may be of importance in stopping a component failure from causing a catastrophic failure of the device, minimizing false positive notifications, and/or the like. In other example applications, the spatial resolution may be of importance to determine the region of the PCB, the location of the failed components, and/or the like. For example, when a power device produces 500 watts of heat during normal operation, the temperature is 102.0 deg C., and when a component fails, 503 watts of heat are produced and the temperature increases to 102.4 deg C. In this example, a 0.4 deg C. change needs to be detected so when a confidence of 99% is specified in the design, a low noise temperature measurement technique may be needed to detect this component failure.

When a power device contains a systemic circulation of gas or liquid, the gas or liquid may be monitored at the circulation center, such as a pump, fan, and/or the like. For example, the power device is mineral oil cooled and the mineral oil temperature is monitored at the circulating pump. The systemic circulation may be temporarily halted during the monitoring or testing of the components of the power device to exacerbate the temperature increase of the components that have altered impedance.

Other sensors or transducers may be used to detect the effects of impedance changes, such as: Color Sensors, Current Transducers, Dust Sensors, Level Sensors, Flow Sensors, Force Sensors, Gas Sensors, Humidity/Moisture Sensors, Image Sensors, Cameras, Magnetic Sensors, Compass sensors, Magnetic Field sensors, Linear magnetic sensors, Magnetic Position/Proximity/Speed Sensors, Motion Accelerometers, Motion Sensors, Gyroscopic sensors, Inertial Measurement Units sensors, Inclinometers, Optical Motion Sensors, Tilt Switches, Vibration Sensors, Optical Sensors, Ambient Light sensors, IR sensors, UV Sensors, Distance Measuring sensors, Photo Sensors—CdS Cells, Optical Sensors, Proximity Sensors, Shock Sensors, Strain Gauges, Temperature Sensors, NTC Thermistors, PTC Thermistors, Resistance Temperature Sensor, Thermocouple, Temperature Probes, Mechanical Thermostats, Solid State Thermostats, Touch Sensors, Ultrasonic sensors, piezo-electric sensors, and/or the like.

Figure 10:
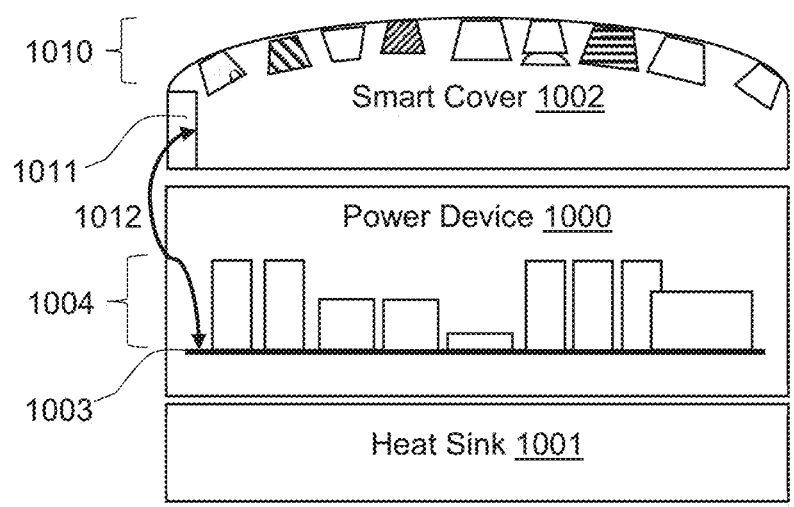
FIG. 10 shows schematically a power device with a sensor selection cover for selecting a component-monitoring sensor, according to illustrative aspects of the disclosure.
Figure 11:
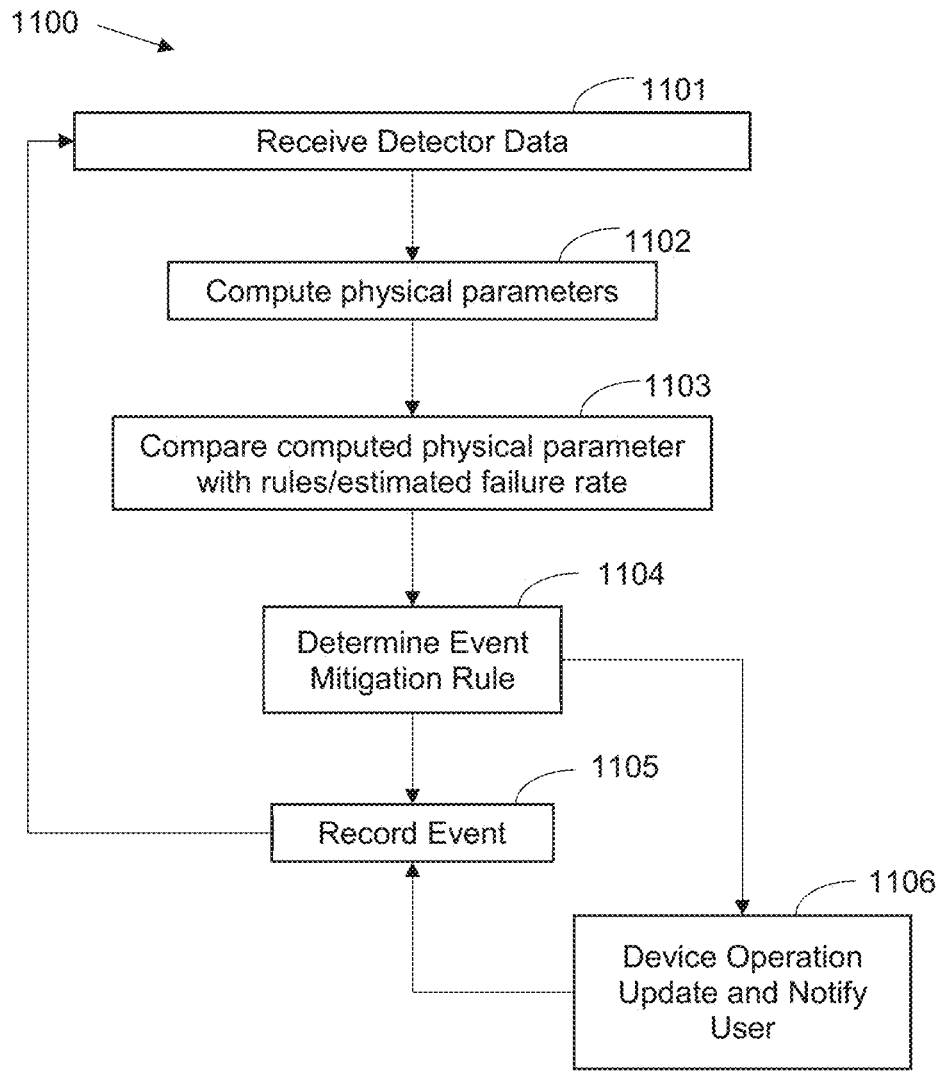
FIG. 11 shows a flowchart of a method for monitoring multiple components with a sensor, according to illustrative aspects of the disclosure.

Reference is now made to FIG. 11, which shows a flowchart of a method 1100 for monitoring multiple components with a sensor, for example utilizing any of the sensors depicted in FIGS. 1D-9, such as S1, S2, and/or the like. Method 1100 may include a step 1101 of receiving sensor data from any of the sensors disclosed herein, and a step 1102 of computing the physical parameters from the data retrieved from the sensor(s), for example, this and following steps performed using hardware processor(s) 101 of FIG. 1A. Method 1100 may include a step 1103 of comparing the parameters using a rule, an estimate, a formula, a threshold, and/or the like, and a step 1104 of determining an event mitigation step/rule. Method 1100 may include a step 1105 of recording the event, and a step 1106 of update/notification to a user that the event occurred, such as to allow user to take further actions/steps. For example, when a component (such as C1 of FIGS. 1A and 1C) overheats, a sensor (such as infrared imaging sensor 410 of FIG. 4) may detect the components temperature using mirror 411 on cover 402) detects this and hardware processor(s) 101 (such as located on PCB 403 of FIG. 4) retrieve via sensor data, compute the temperature, etc. Other sensors as described in FIGS. 1D-9 may be used for the final product power converter including cover, while a sensor selection cover described in FIGS. 10 and 12 may be used to determine which sensors and algorithms may be used to collect data and issue a notification and/or the like when there is a component failure.

To develop accurate detection techniques, physical data may be collected from normal operation, extreme operation, and during failures. As failures may be extremely rare, it is not always possible to have all the data needed to fully differentiate or identify failures before they happen. Therefore, devices are needed to collect as much of the data as possible to determine which of the sensors may best identify the failure before it happens. For this purpose, the devices and methods described may be used to select the monitoring paradigm that may mitigate the most risks associated with failure.

For example, multiple sensors may be incorporated into a sensor selection cover of the power device for detection and monitoring of a few selected power converters, such as a sample of the power converters, while in operation. The data may be analyzed to determine a combination of sensors and algorithms to incorporate into a power converter for mass production. In some cases, the determined sensors may be moved from the cover to the PCB for convenience, maintenance, cost, and/or the like considerations. In some cases, a reflector or wave guide type component may be attached to the inner side of the cover to divert the emissions from the components to the sensor on the PCB, such as when the sensor on the PCB does not have line of sight to the components to be monitored while the sensor on the sensor detection cover had line of sight to the components of interest.

Reference is now made to FIG. 10, which shows schematically a power device 1000 with a sensor selection cover 1002 for selecting a component-monitoring sensor. The sensors may be any one or combination of sensors described herein. Sensor selection cover 1002 may incorporate many sensors 1010 directed towards components 1004 and PCB 1003. Power device 1000 may be attached to heat separator or heat sink 1001. The sensor selection cover 1002 may determine, for example, sensor(s) that may be sensitive to a physical parameter prior to failure of a component 1004. For example, sensor selection cover 1002 may have temperature sensors, time sensors, humidity sensors, sound sensors, cameras, gas sensors, vibration sensors, magnetic sensors, EMI sensors, and/or the like. Sensor selection cover 1002 may include a control circuit 1011, including a power supply, a battery backup, a communication interface, and/or the like. Sensor selection cover 1002 may include a power connector 1012 to power device 1000 (for receiving electrical power for the cover from device 1000), and/or the like.

For example, sensor selection cover 1002 may have a control circuit 1011 including a communication interface, such as a network interface, a Wi-Fi™ interface, a cellular network data interface, and/or the like. Sensor selection cover 1002 control circuit 1011 may include one or more hardware processors, with connected non-volatile, computer-readable storage medium there attached, and the one or more hardware processors are configured to receive data from the sensors, and record the sensor data to the storage medium. In this manner, sensor selection cover 1002 may collect sensor data from components under a variety of operating conditions, and in some circumstances collect data from a failure event, and/or the like. Such data may then be analyzed to determine the sensors, rules, thresholds, and/or the like, for example, as used in method 1100 of FIG. 11 of comparing the parameters using a rule, an estimate, a formula, a threshold, and/or the like. For example, sensor selection covers 1002 may be incorporated at power generation installations located at a variety of environmental conditions. For example, the sensor selection covers 1002 may replace power device covers that do not incorporate sensors 1010 at locations that have specific ambient temperature, humidity, barometric pressure, irradiance, and/or the like, such as high ambient humidity, high temperature, normal barometric pressure, low barometric pressure, high irradiance, and/or different combinations to cover a range of ambient conditions. Collecting the sensor data in these conditions, possibly combined with simulation data of failures, may allow determining which sensors/algorithms best differentiate between components that fail and those that don't.

Sensor selection covers 1002 may be located at specific power generation system sites, when power devices 1000 may be in use, and collect data from these components 1004. When enough data has been collected to characterize the operating environment and normal sensor readings of power device components 1004, a simulation, induction, and/or failure analysis may be used to determine which of the sensors may be most sensitive to the failure of a specific component, of failure or each of the components considered one by one to determine which of the sensors may be most sensitive to an unknown failure. For example, beta sites may be selected for monitoring solar inverters, and the beta sites may be configured with a sensor selection cover on the inverter to monitor the sensor readings of the inverters during normal operation.

Monitoring with a sensor selection cover may benefit when the sensors are not part of a power device printed circuit board (PCB), but on a separate part, such as a cover, a base, or the like. For example, the cover may be a self-contained sensor selection cover which may incorporate a power supply, a communication interface, a backup power, and/or the like.

The test pads for the PCB and component testing may be utilized for monitoring of PCB component impedance. For example, a sensor selection cover may have probes electrically connected to the test pads of the PCB and the sensor selection cover records the electrical data from these pads during operation of the power device.

Sensor selection cover may have independent power supplies, battery backup power supplies, communication interfaces, processors, and/or the like, where the components of the sensor selection cover are independent from the components of the inverter, and may monitor the physical and electrical properties of the power device during operation and/or failure.

A sensor selection cover may be used to select suitable sensors for incorporating in a power device for failure monitoring of the power device and/or components. Sensor selection cover may include multiple sensors of various types and have data logging capabilities. These may also include logging direct measurements of the components using one set of sensors, as well as indirect measurements such as redirected physical properties to sensors using mirrors, acoustic channels, waveguides, transforming materials, and/or the like.

Figure 12:
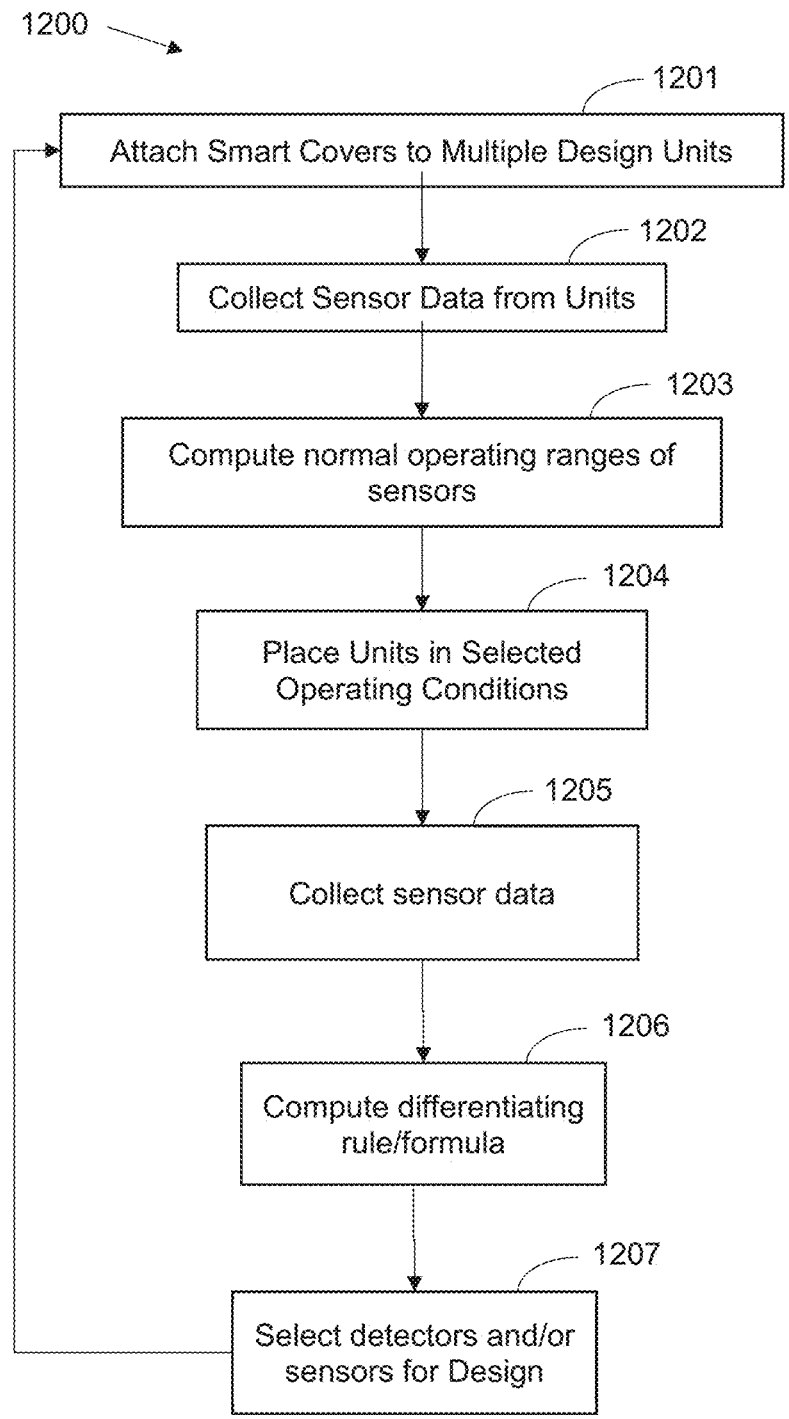
FIG. 12 shows a flowchart of a method for selecting a multiple component-monitoring sensor, according to illustrative aspects of the disclosure.

Reference is now made to FIG. 12, which shows an exemplary flowchart of a method 1200 for selecting a multiple component-monitoring sensor. Method 1200 includes a step 1201 of attaching a sensor selection cover to a multiple power device of the same design (such as power devices with similar layout, components, and/or the like). For example, referring to FIG. 10, smart cover 1002 may incorporate many sensors 1010 directed towards components 1004 and PCB 1003 attached to heat separator or heat sink 1001. The sensor selection cover may determine, for example, sensor(s) that may be sensitive to a physical parameter prior to failure of a component 1004. For example, sensor selection cover 1002 may have temperature sensors, time sensors, humidity sensors, sound sensors, cameras, gas sensors, vibration sensors, magnetic sensors, EMI sensors, and/or the like. Sensor selection cover 1002 may have a power supply, a battery backup 1011, a power connector 1012 to the power device (for receiving power for the cover from the device), and/or the like.

Method 1200 includes a step 1202 of collecting sensor data from the power device during normal operation. For example, in FIG. 10, sensor selection cover 1002 may have a communication interface 1011, such as a network interface, a Wi-Fi™ interface, a cellular network data interface, and/or the like. Smart cover 1002 may have control circuit 1011 including one or more hardware processors, with connected non-volatile, computer-readable storage medium there attached, and the one or more hardware processors are configured to receive data from the sensors, and record the sensor data to the storage medium. Smart cover 1002 may collect sensor data from components under normal operating conditions. Method 1200 includes a step 1203 of computing normal operating ranges of sensors based on the data collected during normal operations. Method 1200 includes a step 1204 of placing the units in selected environmental conditions, such as high humidity environments, or attaching covers to power devices located in extreme environments, such as extremely high or low temperature environments. Method 1200 includes a step 1205 of collecting sensor data from the power device during operation in the selected environments. For example, in FIG. 10, smart cover 1002 may collect sensor data from components under selected operating conditions. Method 1200 includes a step 1206 of computing a rule/formula for differentiating the component operation in different conditions based on the sensor data, and a step 1207 of selecting one or more detectors/sensors that for the power device design.

For example, step-wise linear regression, principle component analysis, multivariate statistics, and/or the like, of the sensors' measurements of the components and simulations data may be used find the sensors measurements and formulas/rules that differentiate between normal operation of the components and failure of the components. The sensors measure the components physical parameters, which may be surrogates of the electrical parameters related to the reliability of the components. For example, temperature may be related to the ESR of the component.

A power device cover or sensor selection cover may include pressure relief breakout regions in the cover, outgassing relief paths, and/or the like.

Once the normal operating physical parameters and characteristics are determined, the Gaussian distributions for normal and extreme operation of the components may be determined. A power device with a sensor selection cover may be configured and operated to induce failure of one or more components, such as by introducing humidity, heat, temperature change, voltages, currents, and/or the like. Equivalent serial resistance (ESR) may be measured in laboratory conditions, as well as the sensor values. The ESR and sensor values may be monitored until failure, and the results analyzed to determine which sensor detected the ESR changes, may be correlated with the ESR changes, was statistically analyzed to determine the ESR changes (such as using multivariate analysis), and/or the like.

For example, the types of physical parameters or the sensors used to detect the physical parameters may be: Gas Chromatography, Sound, Vibration, Light, EMI, and/or the like.

Laboratory tests of components during induced failures may detect the physical parameters associated with the component failure, and by repeating these failure inductions, enough data may be collected to determine a threshold for detection, such as a 95% confidence interval threshold and/or the like. Together with rules and/or combinations of sensor/detector values, the parameters and algorithms that may detect failure of components may be determined based on normal, extreme, and failure detections (such as using machine learning, multivariate statistics, outlier analysis, and/or the like). The laboratory test may be performed in a laboratory using mock up power devices, power generation components/elements/systems, and/or the like, or in the field (such as a working power generation installation) using the real components/devices. In field-induced failures, additional devices and/or precautions may be incorporated to prevent harm or permanent damage from the induced failures.

The analysis may be used to select the incorporation of sensors in the power device, such as to achieve a specific confidence interval, a false positive rate, a receiver-operator curve value, and/or the like. Monitoring of these selected sensors using algorithms for failure detection and/or the like may allow detection of a component that is about to fail.

Figure 13:
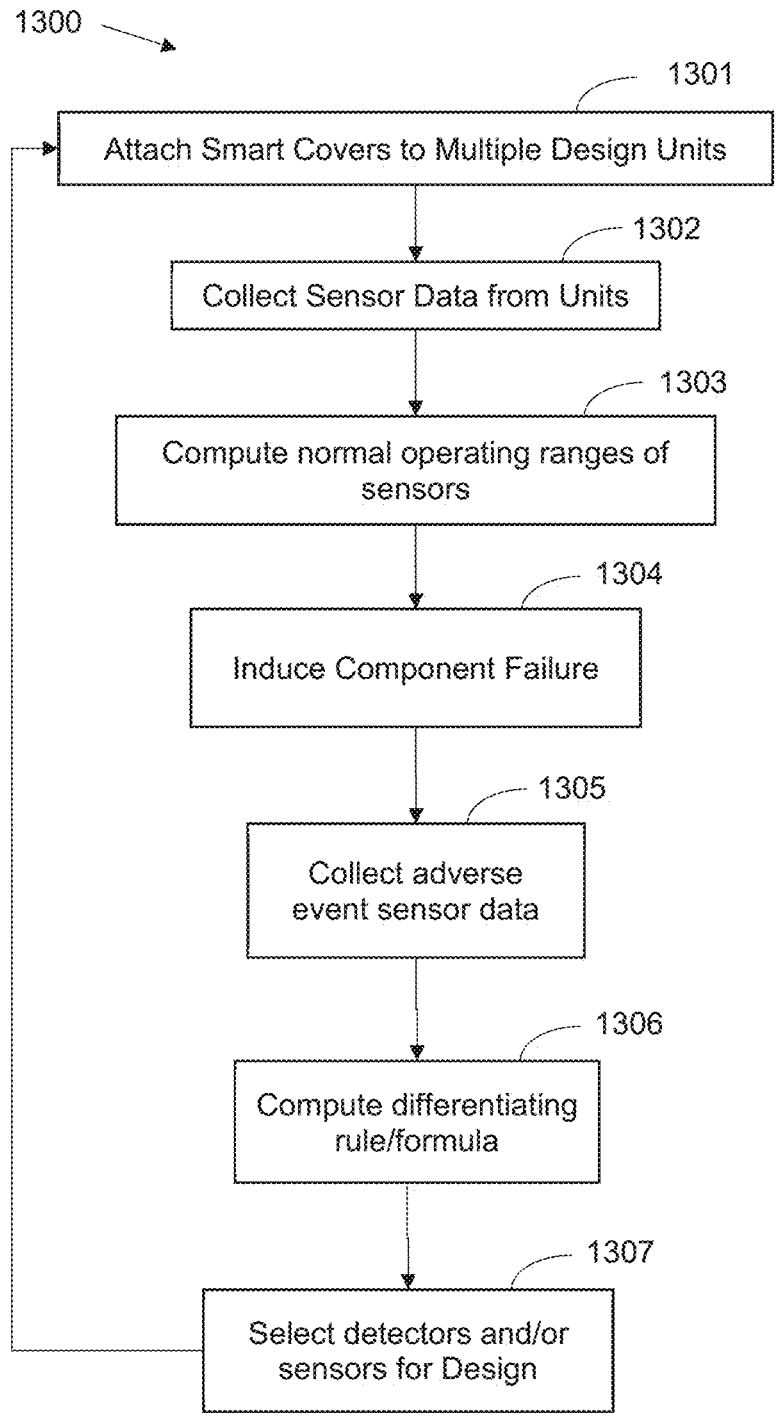
FIG. 13 shows a flowchart of a method for inducing component failure and selecting a multiple component-monitoring sensor, according to illustrative aspects of the disclosure.

Reference is now made to FIG. 13, which shows an exemplary flowchart of a method 1300 for inducing component failure and selecting a multiple component-monitoring sensor. Method 1300 may include a step 1301 of attaching a sensor selection cover to one or more power device. For example, referring to FIG. 10, smart cover 1002 may incorporate many sensors 1010 directed towards components 1004 and PCB 1003 attached to heat separator or heat sink 1001. The sensor selection cover may determine, for example, sensor(s) that may be sensitive to a physical parameter prior to failure of a component 1004. For example, sensor selection cover 1002 may have temperature sensors, time sensors, humidity sensors, sound sensors, cameras, gas sensors, vibration sensors, magnetic sensors, EMI sensors, and/or the like. Sensor selection cover 1002 may have a power supply, a battery backup 1011, a power connector 1012 to the power device (for receiving power for the cover from the device), and/or the like.

Method 1300 may include a step 1302 of collecting sensor data from the power device. For example, in FIG. 10, sensor selection cover 1002 may have a communication interface 1011, such as a network interface, a Wi-Fi™ interface, a cellular network data interface, and/or the like. Smart cover 1002 may have one or more hardware processors, with connected non-volatile, computer-readable storage medium there attached, and the one or more hardware processors are configured to receive data from the sensors, and record the sensor data to the storage medium. Smart cover 1002 may collect sensor data from components under normal operating conditions. Method 1300 may include a step 1303 of computing normal operating ranges of sensor values based on the data collected during normal operations. Method 1300 may include a step 1304 inducing component failure, such as by changing a temperature, a humidity, an electrical voltage, an electrical current, and/or the like. Method 1300 may include a step 1305 of collecting one or more sensors' data during the failure of the component. For example, in FIG. 10, smart cover 1002 may collect sensor data from components from a failure event, and/or the like. Method 1300 may include a step 1306 of computing a rule/formula of one or more sensor values to detect the failure. Method 1300 may include a step 1307 of selecting detectors/sensors for the power device design.

Figure 14:
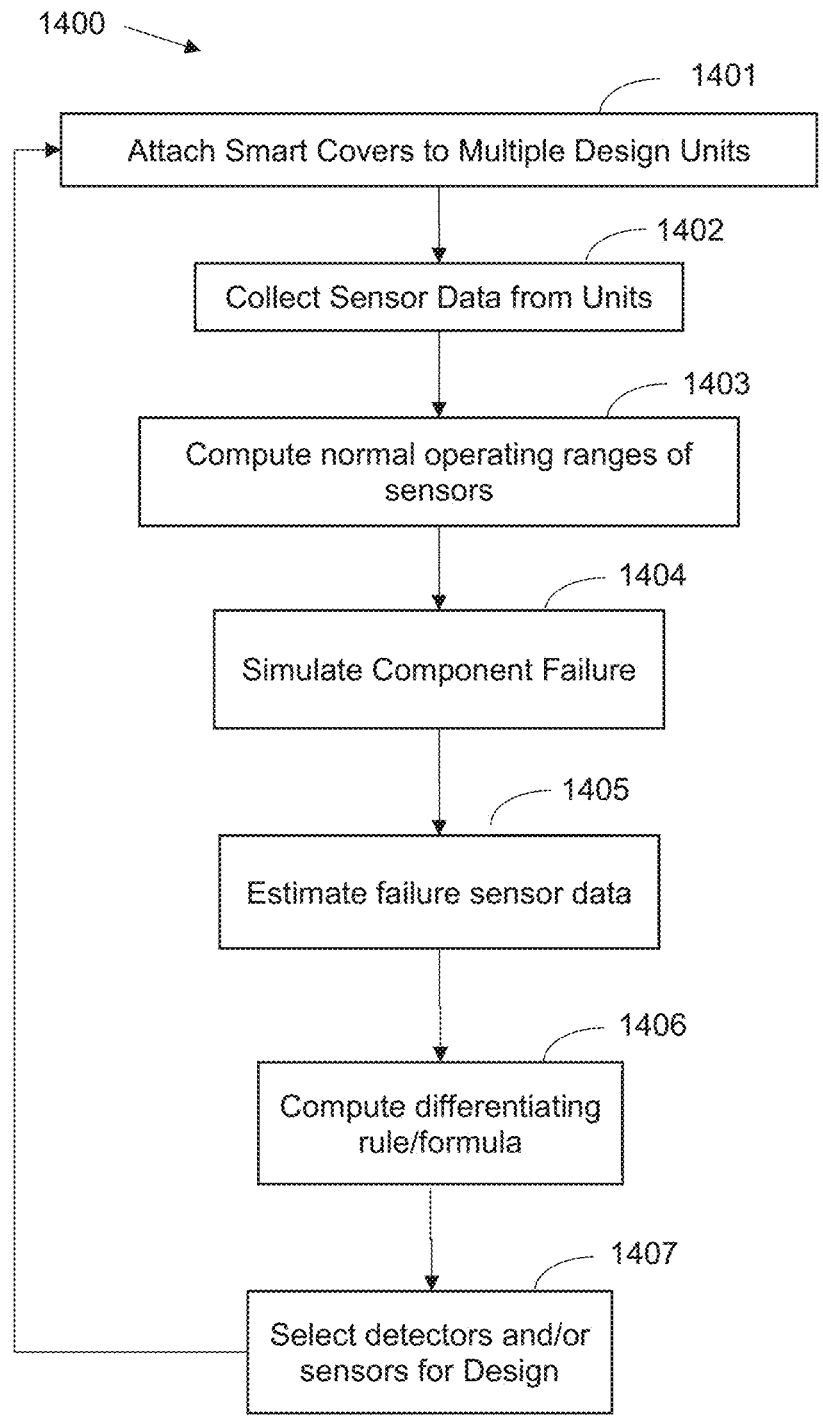
FIG. 14 shows a flowchart of a method for simulating component failure and selecting a multiple component-monitoring sensor, according to illustrative aspects of the disclosure.

Reference is now made to FIG. 14, which shows an exemplary flowchart of a method 1400 for failure analysis/simulating component failure and selecting a multiple component-monitoring detector. Method 1400 may include a step 1401 of attaching a sensor selection cover to one or more power device. For example, referring to FIG. 10, smart cover 1002 may incorporate many sensors 1010 directed towards components 1004 and PCB 1003 attached to heat separator or heat sink 1001. The sensor selection cover may determine, for example, sensor(s) that may be sensitive to a physical parameter prior to failure of a component 1004. For example, sensor selection cover 1002 may have temperature sensors, time sensors, humidity sensors, sound sensors, cameras, gas sensors, vibration sensors, magnetic sensors, EMI sensors, and/or the like. Sensor selection cover 1002 may have a power supply, a battery backup 1011, a power connector 1012 to the power device (for receiving power for the cover from the device), and/or the like.

Method 1400 may include a step 1402 of collecting sensor data from the power device. For example, in FIG. 10, sensor selection cover 1002 may have a communication interface 1011, such as a network interface, a Wi-Fi™ interface, a cellular network data interface, and/or the like. Smart cover 1002 may have one or more hardware processors, with connected non-volatile, computer-readable storage medium there attached, and the one or more hardware processors are configured to receive data from the sensors, and record the sensor data to the storage medium. Smart cover 1002 may collect sensor data from components under normal operating conditions. Method 1400 may include a step 1403 of computing normal operating ranges of sensor values. Method 1400 may include a step 1404 simulating component failure, such as by modeling the operation of the power device during failure, such as using an electronic design analysis (EDA) tool, Simulation Program with Integrated Circuit Emphasis (SPICE), and/or the like (Ngspice, LT-spice®, OrCAD®, and/or the like). Method 1400 may include a step 1405 of estimating one or more sensors' data during the failure of the component. Method 1400 may include a step 1406 of computing a rule/formula of one or more estimated sensor values to detect the failure. Method 1400 may include a step 1407 of selecting detectors/sensors for the power device design.

The steps of FIGS. 11-14 may be combined to perform alternative techniques for determining the sensors/rules/formulas for computing a probability of future failure, as well as performing the computing using the sensors/rules/formulas in a power device. For example, the steps of methods 1200, 1300, or 1400, may use covers 1002 to determine that some types of sensors may not be needed for computing a high probability of determination as in step 1103 of method 1100, but may be candidates for future determinations based on a larger sample set, and thus include in the mass production design implemented in the power device. During operation of the power devices, these low probability sensors may be used to collect data as at steps 1101, 1202, 1205, 1302, and/or 1402, and then the remaining steps of methods 1200, 1300, and/or 1400 performed to determine modifications to the rules/formulas as at 1206, 1306, and/or 1406. A software and/or firmware update to the power device may then incorporate the modifications to perform method 1100 with the modified rules/formulas. For example, a method may use steps of methods 1200, 1300, and 1400 to determine the sensors/rules/formulas to use in detecting failures, such as a method 1200 further comprising steps 1304, 1305, 1404, and/or 1405 in any combination.

For example, a method for determining the sensors/rules/formulas uses a combination of data collection, simulation, and failure induction. For example, a method for determining the sensors/rules/formulas uses a combination of data collection, and failure induction. For example, a method for determining the sensors/rules/formulas uses a combination of data collection, and simulation. For example, a method for determining the sensors/rules/formulas uses a combination of simulation, and failure induction.

For example, film capacitors may incorporate an NTC for failure detection. For example, an NTC temperature sensor may be used attached to the PCB, the component, near the component, and/or the like. A derating mechanism may monitor the highest temperature of a group of NTCs or one of the NTCs (such as on the side of a DC-AC converter of the power device that generates heat regardless of the pending failure of a component). For example, when the power device is an inverter, the inverter may be derated according to a table determined from laboratory measurements of normal operation. The inverter may be derated when an exception to the normal occurs, such as an abnormal heating in a film capacitor, especially when such heating happens quickly. As used herein, the term derated means to operate an electronic device at a specification that is substantially within the specifications of the device, such as substantially different than the limits of the device operation. For example, a power device rated to supply 1000 watts of power is derated to operate at 800 watts. For example, a refrigerator that is rated to reach an internal compartment temperature of −20 deg C. is operated at a temperature of −10 deg C.

One or more processors may be used to monitor sensors and notify of a suspected future failure, such as a pending failure condition. For example, one or more processors may be incorporated with or near the sensors for the component(s) to be tested, and the processor(s) used to notify when the sensors indicate a possible future failure. For example, a processor and sensors may be located near terminals for connecting input and output power to a device. When the impedance of the terminals as measured by the sensor(s) and compute by the processor(s) indicates a problem is eminent, the processor(s) may notify that the performance of the power device may be improved and/or fire hazard reduced when the terminals are tightened/reseated.

For example, the sensors may be configured to monitor an attribute of one or more components by being directed at an orientation to detect a change in the attribute. For example, a sensor may be configured to monitor the temperature of a component by being configured to detect an infrared wavelength emission from the component corresponding to the desired temperature. As used herein, a non-transitory computer-readable storage medium, such as a memory, hard-disk, flash memory, read-only memory, and/or the like, may be connected to the processor to store rules and/or sensor values used to monitor the components pending failure condition. When the processor monitors the sensor values, the processor continuously collects the sensor values, and evaluates the rule with the ongoing sensor values to determine when the rule indicates that the component is about to fail.

A sensor may be configured to monitor one component or multiple components. For example, a sensor may be oriented such that several components are in the field of view of the sensor, and the sensor comprises a spatial encoding mechanism to separate the attributes of each component for evaluation and monitoring, such as an optical camera sensor with an array of sensing elements. The monitoring of the attribute may be a physical attribute, such as a temperature, color, shape, size, and/or the like, or an electrical attribute, such as an impedance, a voltage, a current, and/or the like. When a pending failure is condition is detected, the power device may be derated, such as by modifying an operational characteristic of the power device, such as a current, a voltage, a ramp up/down rate, and/or the like.

A sensor may detect vibration or acoustic attributes of an electrical component by using an acceleration sensor configured to detect vibrations. Similarly, an electromagnetic (EM) radiation sensor may be configured to detect electromagnetic radiation interference produced when a component is about to fail. A radiofrequency transceiver connected to the EM sensor and the power of the radio signals used as an indication of pending failure conditions. A chemical sensor, such as a gas chromatography sensor, a gas spectroscopy sensor, an ion sensor, an ionic sensor, and/or the like may be configured to detect a byproduct of a pending failure condition, such as gasses produced by the heated insulation, hydrogen, methane, and/or the like.

Here, as elsewhere in the specification and claims, ranges can be combined to form larger ranges.

Specific dimensions, specific materials, specific ranges, specific resistivities, specific voltages, specific shapes, and/or other specific properties and values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (for example, the disclosure of a first value and a second value for a given parameter can be interpreted as disclosing that any value between the first and second values could also be employed for the given parameter). For example, when Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, when parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

It may be noted that various connections are set forth between elements herein, elements of both methods and devices. These elements and connections are described in general and, unless specified otherwise, may be direct or indirect; this specification is not intended to be limiting in this respect, and both direct and indirect connections are envisioned, nor limiting with respect to combinations of elements. For example, the steps of each of FIGS. 11-14 may be rearranged and combined in any order, and not all steps need be performed. Further, elements of one feature in any of the embodiments may be combined with elements from other features in any of the embodiments, in any combinations or sub-combinations. For example, one or more steps of FIG. 11 may be combined with one or more steps of FIGS. 12-14. For example, skilled readers of this disclosure may identify method steps that are not directly dependent, despite an indication of so in the exemplary methods disclosed herein, and reorder the steps differently while achieving the same result(s) of the disclosed invention.

All described features, and modifications of the described features, are usable in all aspects of the inventions taught herein. Furthermore, all of the features, and all of the modifications of the features, of all of the embodiments described herein, are combinable and interchangeable with one another.

The invention claimed is:

1. A system comprising:
   a user terminal comprising a terminal processor and a graphical user interface (GUI); and
   a power device comprising:
      a housing comprising a cover;
      a printed circuit board (PCB), wherein the PCB is located inside the housing;
      at least one electrical component comprising at least one attribute, wherein the at least one electrical component is located on the PCB inside the housing;
      at least one sensor configured to monitor the at least one attribute, wherein the at least one sensor is located on the PCB inside the housing, wherein the at least one attribute is generated inside the housing;
      a non-transitory computer-readable storage medium comprising at least one alerting rule; and
      at least one processor configured to:
         retrieve the at least one alerting rule from the storage medium,
         monitor at least one sensor value from the at least one sensor, wherein the at least one sensor value is associated with the at least one attribute,
         evaluate the at least one alerting rule during the monitoring, and
         when the at least one alerting rule results in a pending failure condition, send a notification to a user by sending the notification to the user terminal, wherein the terminal processor is configured to display the notification on the GUI;
      wherein the cover comprises a reflector, and wherein the reflector is configured to direct the at least one attribute from the at least one electrical component to the at least one sensor.

2. The system of claim 1, further comprising storing at least one previous sensor value on the storage medium, and the at least one previous sensor value is used for evaluating the at least one alerting rule.

3. The system of claim 1, wherein the at least one sensor is configured to separately monitor a plurality of attributes of the at least one electrical component, and the evaluating comprises analyzing sensor values associated with the plurality of attributes.

4. The system of claim 1, comprising a plurality of electrical components comprising a respective plurality of attributes, and the evaluating comprises analyzing sensor values associated with the plurality of attributes.

5. The system of claim 1, comprising a plurality of sensors, each sensor measuring at least one of a plurality of attributes, and wherein the evaluating comprises analyzing a plurality of sensor values associated with the plurality of attributes.

6. The system of claim 1, comprising a plurality of electrical components, and wherein the at least one sensor is configured to monitor a plurality of attributes of the plurality of electrical components, and wherein the evaluating comprises analyzing a plurality of sensor values associated with the plurality of attributes.

7. The system of claim 1, wherein the at least one attribute is at least one of an electrical property and a physical property.

8. The system of claim 1, wherein when the at least one alerting rule evaluation indicates the pending failure condition, the at least one processor modifies at least one operational characteristic of the power device.

9. The system of claim 1, wherein the at least one sensor is located at least 1 centimeter (cm) from the at least one electrical component.

10. The system of claim 1, wherein the at least one sensor is located at least 2 cm from the at least one electrical component.

11. The system of claim 1, wherein the at least one sensor is located at least 5 cm from the at least one electrical component.

12. The system of claim 1, wherein the storage medium is located remotely to the power device.

13. The system of claim 1, wherein the at least one processor is located remotely to the power device.

14. The system of claim 1, wherein the cover comprises the at least one sensor.

15. The system of claim 1, wherein the at least one electrical component is line-of-sight obscured from the at least one sensor.

16. The system of claim 1, wherein the at least one sensor is at last one sensor selected from the group consisting of a temperature sensor, an acoustic sensor, a motion sensor, an acceleration sensor, an optical sensor, a thermal camera, a digital camera, a photodiode, an infrared photodiode, an electromagnetic radiation sensor, a magnetic sensor, a radiofrequency transceiver, a chemical sensor, a gas spectrometer, a chromatography sensor, an ionic sensor, and a humidity sensor.

17. A method comprising:
   retrieving at least one alerting rule from a storage medium;
   directing, using a reflector, at least one attribute of an electrical component of a power device to at least one sensor of the power device, wherein the power device comprises a PCB and a housing, wherein the housing comprises a cover, wherein the electrical component and the at least one sensor are located on the PCB inside the housing, wherein the at least one attribute is generated inside the housing, wherein the cover comprises the reflector, and wherein the reflector is configured to direct the at least one attribute of the electrical component to the at least one sensor;
   monitoring at least one sensor value from the at least one sensor, wherein the at least one sensor value is associated with at least one attribute of the electrical component of the power device;
   evaluating the at least one alerting rule during the monitoring; and
   when the at least one alerting rule results in a pending failure condition:
      sending a notification to a user terminal, and
      displaying the notification on a graphical user interface of the user terminal.

18. The method of claim 17, wherein the electrical component is line-of-sight obscured from the at least one sensor.

19. The method of claim 17, further comprising storing at least one previous sensor value on the storage medium, and the at least one previous sensor value is used for evaluating the at least one alerting rule.

20. The method of claim 17, wherein the at least one sensor is configured to separately monitor a plurality of attributes of the at least one electrical component, and the evaluating comprises analyzing sensor values associated with the plurality of attributes.

\* \* \* \* \*